US010086788B2

(12) United States Patent
Ando

(10) Patent No.: US 10,086,788 B2
(45) Date of Patent: *Oct. 2, 2018

(54) KNEE-PROTECTING AIRBAG DEVICE

(71) Applicant: TOYODA GOSEI CO., LTD., Kiyosu-shi, Aichi-ken (JP)

(72) Inventor: Takeshi Ando, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 70 days.

This patent is subject to a terminal disclaimer.

(21) Appl. No.: 15/045,374

(22) Filed: Feb. 17, 2016

(65) Prior Publication Data
US 2016/0288758 A1    Oct. 6, 2016

(30) Foreign Application Priority Data
Mar. 31, 2015   (JP) .................................. 2015-71682

(51) Int. Cl.
*B60R 21/206* (2011.01)
*B60R 21/2338* (2011.01)
*B60R 21/231* (2011.01)

(52) U.S. Cl.
CPC .......... *B60R 21/206* (2013.01); *B60R 21/231* (2013.01); *B60R 2021/23169* (2013.01); *B60R 2021/23382* (2013.01)

(58) Field of Classification Search
CPC ................ B60R 21/206; B60R 21/231; B60R 2021/23382; B60R 2021/23169
See application file for complete search history.

(56) References Cited

U.S. PATENT DOCUMENTS

| 7,434,837 B2 * | 10/2008 | Hotta ................... | B60R 21/206 280/729 |
| 7,963,550 B2 * | 6/2011 | Hong ................... | B60R 21/206 280/729 |
| 8,272,667 B2 * | 9/2012 | Schneider ............ | B60R 21/206 280/728.2 |
| 8,393,636 B2 * | 3/2013 | Tanaka ................. | B60R 21/206 280/729 |
| 8,393,638 B2 * | 3/2013 | Gottschalk et al. .. | B60R 21/206 280/730.1 |

(Continued)

FOREIGN PATENT DOCUMENTS

JP    2013-119327 A    6/2013
WO    WO-2014168364 A1 * 10/2014 ........... B60R 21/206

*Primary Examiner* — Paul N Dickson
*Assistant Examiner* — Joselynn Y Sliteris
(74) *Attorney, Agent, or Firm* — Posz Law Group, PLC

(57) ABSTRACT

An airbag of a knee-protecting airbag device is mounted on a case together with an inflator with the aid of mounting means of the inflator. The case is provided with an airbag emergence opening at the lower end region. The airbag includes a vehicle body side panel, an occupant side panel, a mounting inflatable region which is located in a lower end region of the airbag as deployed and is secured to the case, and a knee-protecting region deployable in such a manner as to extend rearwardly and upwardly from the mounting inflatable region. The airbag further includes inside the mounting inflatable region a tether which joins the vehicle body side panel and occupant side panel for regulating a clearance between the vehicle body side panel and occupant side panel at airbag deployment.

8 Claims, 20 Drawing Sheets

(56) References Cited

U.S. PATENT DOCUMENTS

| | | | |
|---|---|---|---|
| 8,505,969 B2* | 8/2013 | Mendez | B60R 21/206 |
| | | | 280/729 |
| 8,684,400 B2* | 4/2014 | Picard et al. | B60R 21/2338 |
| | | | 280/729 |
| 8,696,020 B2* | 4/2014 | Tanaka | B60R 21/233 |
| | | | 280/728.2 |
| 8,998,249 B2* | 4/2015 | Tanaka | B60R 21/206 |
| | | | 280/729 |
| 9,180,835 B2* | 11/2015 | Fukawatase | B60R 21/231 |
| 9,340,173 B2* | 5/2016 | Kojima | B60R 21/206 |
| 9,365,182 B2* | 6/2016 | Tanaka | B60R 21/206 |
| 9,592,787 B2* | 3/2017 | Jung et al. | B60R 21/206 |
| 9,669,793 B2* | 6/2017 | Jung et al. | B60R 21/206 |
| 9,902,361 B2* | 2/2018 | Lee | B60R 21/205 |
| 2012/0025498 A1* | 2/2012 | Tanaka | B60R 21/233 |
| | | | 280/730.2 |
| 2017/0057447 A1* | 3/2017 | Ando | B60R 21/233 |

* cited by examiner

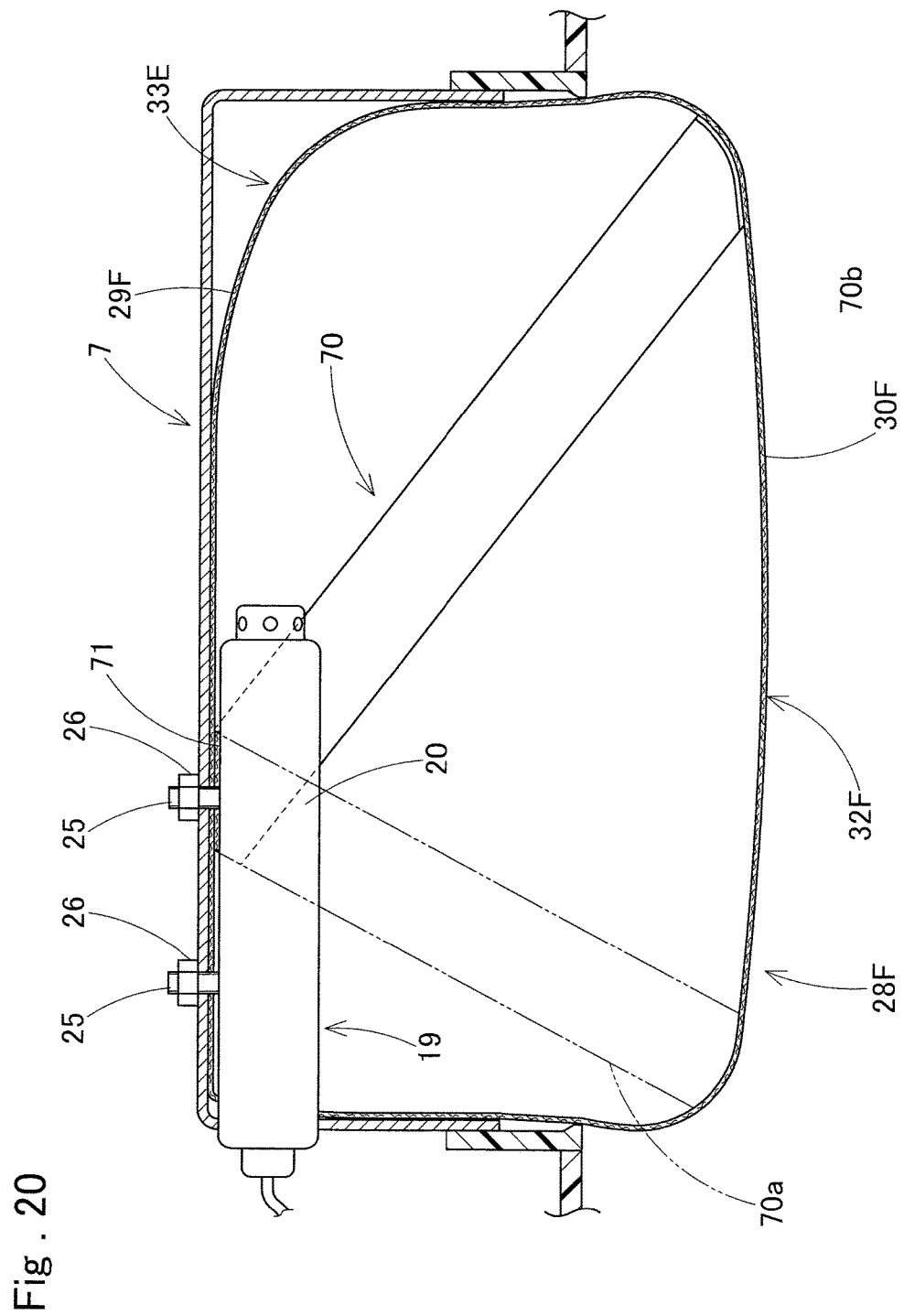

KNEE-PROTECTING AIRBAG DEVICE

CROSS REFERENCE TO RELATED APPLICATIONS

The present application claims priority from Japanese Patent Application No. 2015-071682 of Ando, filed on Mar. 31, 2015, the entire disclosure of which is incorporated herein by reference.

BACKGROUND OF THE INVENTION

1. Field of the Invention

The present invention relates to a knee-protecting airbag device which includes an airbag, an inflator for feeding the airbag with an inflation gas and a generally box-shaped case for housing the airbag and inflator and which case includes an airbag emergence opening at the bottom end region.

2. Description of Related Art

JP2013-119327A discloses a known knee-protecting airbag device which includes an airbag, an inflator which is generally cylindrical in shape and a case for housing the airbag and inflator. The case includes an airbag emergence opening at the bottom end region. The inflator includes a mounting bolt with which the inflator is mounted on the case, and the airbag is also mounted on the case with the aid of the mounting bolt of the inflator.

The airbag is mounted on the case with the mounting bolt of the inflator in such a manner that the cylindrical inflator supports a mounting inflatable region of the airbag, and the airbag emergence opening of the case is configured to be openable downward. With this configuration, the mounting inflatable region of the airbag is likely to protrude considerably downward out of the emergence opening in an initial stage of airbag deployment. In order to address this problem, the known knee-protecting airbag device is provided, on an outside of the mounting inflatable region of the airbag, with a tether that is fixed to the case by the opposite ends with a separate mounting means and located inside the case for covering an underside of the mounting inflatable region of the airbag and regulating the outer contour of the mounting inflatable region at airbag deployment.

However, since the tether is provided separate from the airbag, attached to the outside of the airbag and requires additional mounting work on the case, this configuration has a room for improvement in simplification.

SUMMARY OF THE INVENTION

An object of the present invention is to provide a knee-protecting airbag device which is capable of deploying an airbag quickly while controlling a contour of the airbag as deployed with a simple configuration.

The knee-protecting airbag device of the invention is mountable on a vehicle and includes an airbag, an inflator for feeding an inflation gas to the airbag and a case for housing the airbag and inflator. The case is provided with an airbag emergence opening at the lower end region. The inflator is generally cylindrical in outer contour and includes a mounting means with which the inflator and airbag are mounted on the case.

The airbag is mounted on the case in a folded-up configuration with the aid of the mounting means together with the inflator and includes:
 a vehicle body side panel deployable towards a vehicle body structure;
 an occupant side panel deployable towards a seat of the vehicle;
 a mounting inflatable region that is located in a lower end region of the airbag as deployed and is secured to the case;
 a knee-protecting region that is deployable in such a manner as to extend rearwardly and upwardly from the mounting inflatable region for protecting knees of a vehicle occupant; and
 a tether that is disposed inside the mounting inflatable region and joins the vehicle body side panel and occupant side panel for regulating a clearance between the vehicle body side panel and occupant side panel at airbag deployment.

With the knee-protecting airbag device of the invention, the mounting inflatable region of the airbag will inflate with a clearance between the vehicle body side panel and occupant side panel limited by the tether disposed inside the mounting inflatable region although the case is provided with the airbag emergence opening at the lower end region and the airbag is likely to protrude downward out of the opening in an initial stage of deployment. Accordingly, the mounting inflatable region will be prevented from inflating unduly thick and protruding too downward, and the inflation gas will be directed towards the knee-protection region quickly to deploy the knee-protection region quickly. In addition, since the tether is disposed in such a manner as to connect the vehicle body side panel and occupant side panel inside the mounting inflatable region, the tether has a simpler configuration in comparison with conventional knee-protecting airbag devices.

Therefore, the knee-protecting airbag device of the invention will be capable of deploying the airbag quickly while controlling the deployed contour of the airbag with a simple configuration.

In the knee-protecting airbag device of the invention, it is desired that an upper end region of the tether joined to the vehicle body side panel is supported by the inflator directly or indirectly at airbag deployment. This configuration will prevent the upper end region of the tether from moving downward and regulate a clearance between the occupant side panel of the mounting inflatable region and case, thus preventing the mounting inflatable region from protruding downward unduly.

In the knee-protecting airbag device of the invention, the tether may be configured to be deployable in front of the inflator. Alternatively, the tether may be configured to be deployable at the rear of the inflator.

Furthermore, in the knee-protecting airbag device of the invention, it is desired that:
 the tether is formed into a band deployable generally along a left and right direction; and
 a first end in a width direction of the tether is joined to the vehicle body side panel generally entirely while a second end in the width direction of the tether is joined to the occupant side panel generally entirely, such that the tether is disposed over a generally entire area in a left and right direction of the mounting inflatable region.

This configuration will prevent an entire area in a left and right direction of the mounting inflatable region from protruding downward at airbag deployment and help inflate the airbag in a balanced fashion in a left and right direction quickly.

Moreover, if the tether of the airbag device of the invention is configured to be deployable within an area immediately below the case in a front and rear direction, a region of the mounting inflatable region deployable immediately below the case in a front and rear direction will be prevented from protruding unduly downward.

BRIEF DESCRIPTION OF DRAWINGS

FIG. 20 is a schematic vertical section of the airbag of FIG. 19 as fully deployed, taken along a left and right direction of the vehicle at the mounting inflatable region and viewed from the rear of the vehicle.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
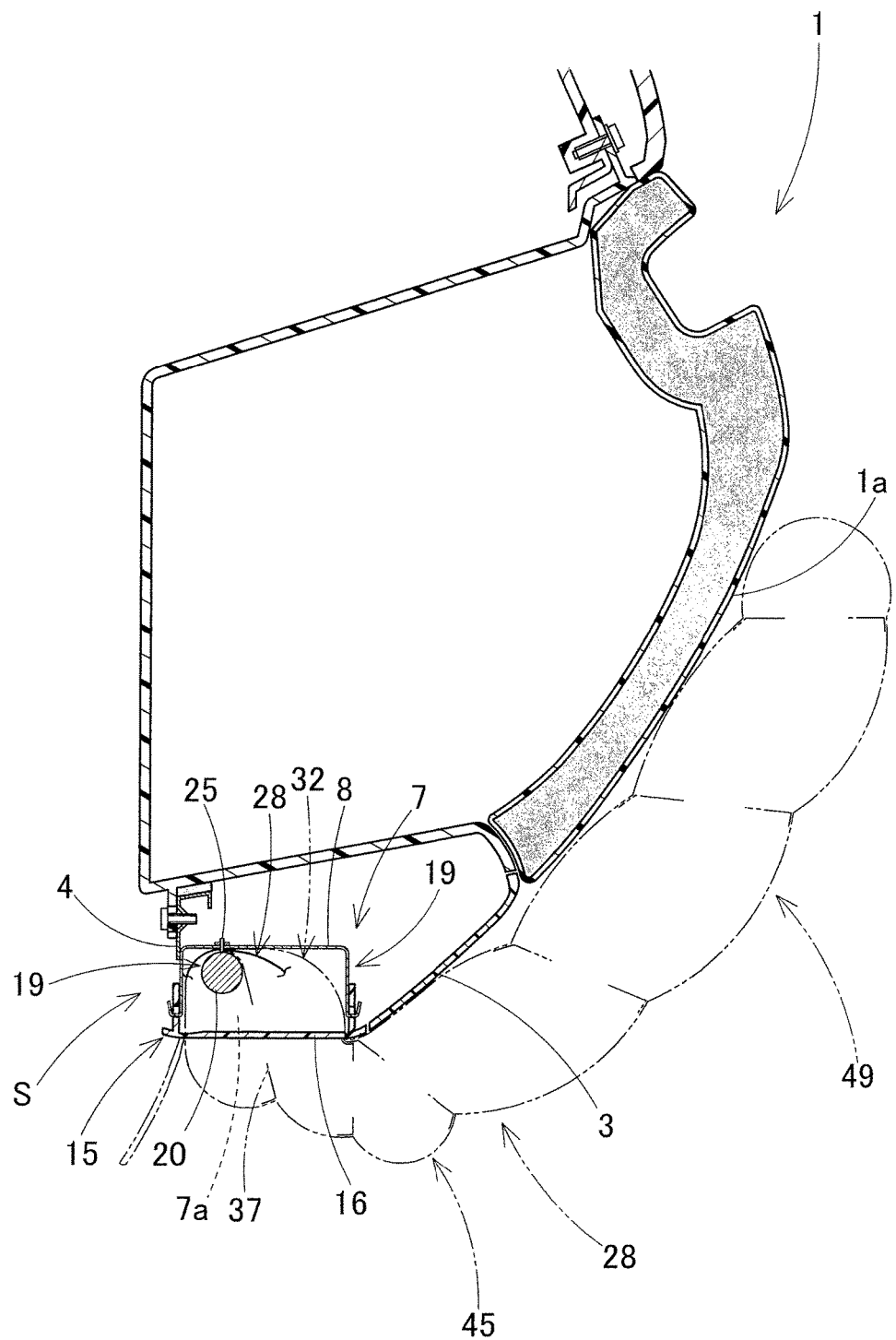
FIG. 1 is a schematic vertical section of a knee-protecting airbag device embodying the invention as mounted on a vehicle, taken along a front and rear direction of the vehicle.

In this specification, a preferred embodiment will be described as applied to a knee-protecting airbag device S mountable in front of a front passenger seat of a vehicle, as shown in FIG. 1.

The knee-protecting airbag device S is located beneath the glove box 1 in front of the front passenger seat. Unless otherwise specified, up/down, left/right and front/rear directions in this specification are intended to refer to up/down, left/right and front/rear directions of the vehicle equipped with the airbag device S.

Figure 2:
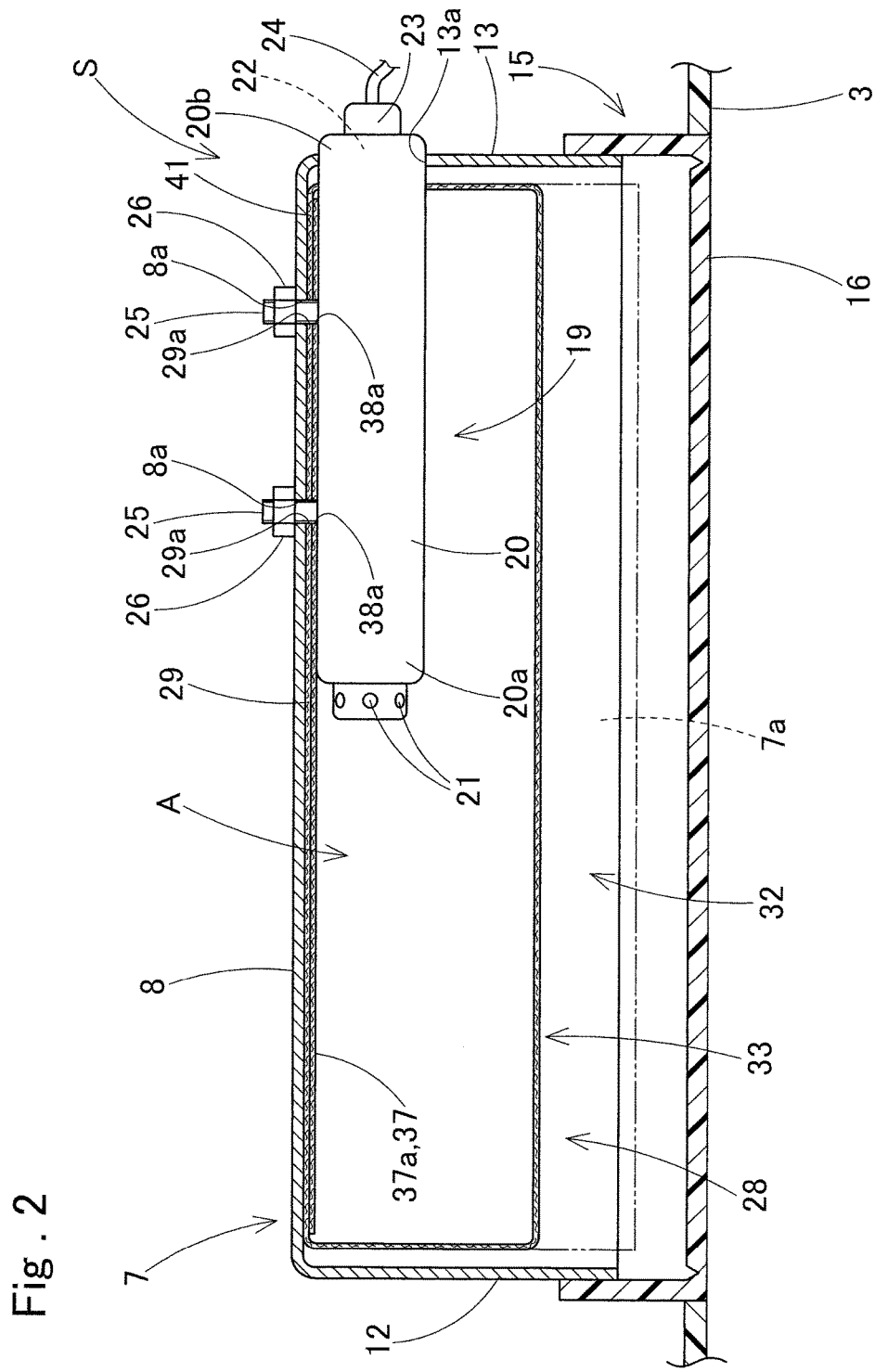
FIG. 2 is a schematic enlarged vertical section of the airbag device of FIG. 1 taken along a left and right direction of the vehicle and viewed from the front side of the vehicle.

As shown in FIGS. 1 and 2, the airbag device S includes an airbag 28, which is in a folded-up configuration, an inflator 19 for feeding the airbag 28 with an inflation gas, a case 7 for housing the airbag 28 and inflator 19 and an airbag cover 15 for covering an airbag emergence opening 7a of the case 7.

Figure 11:
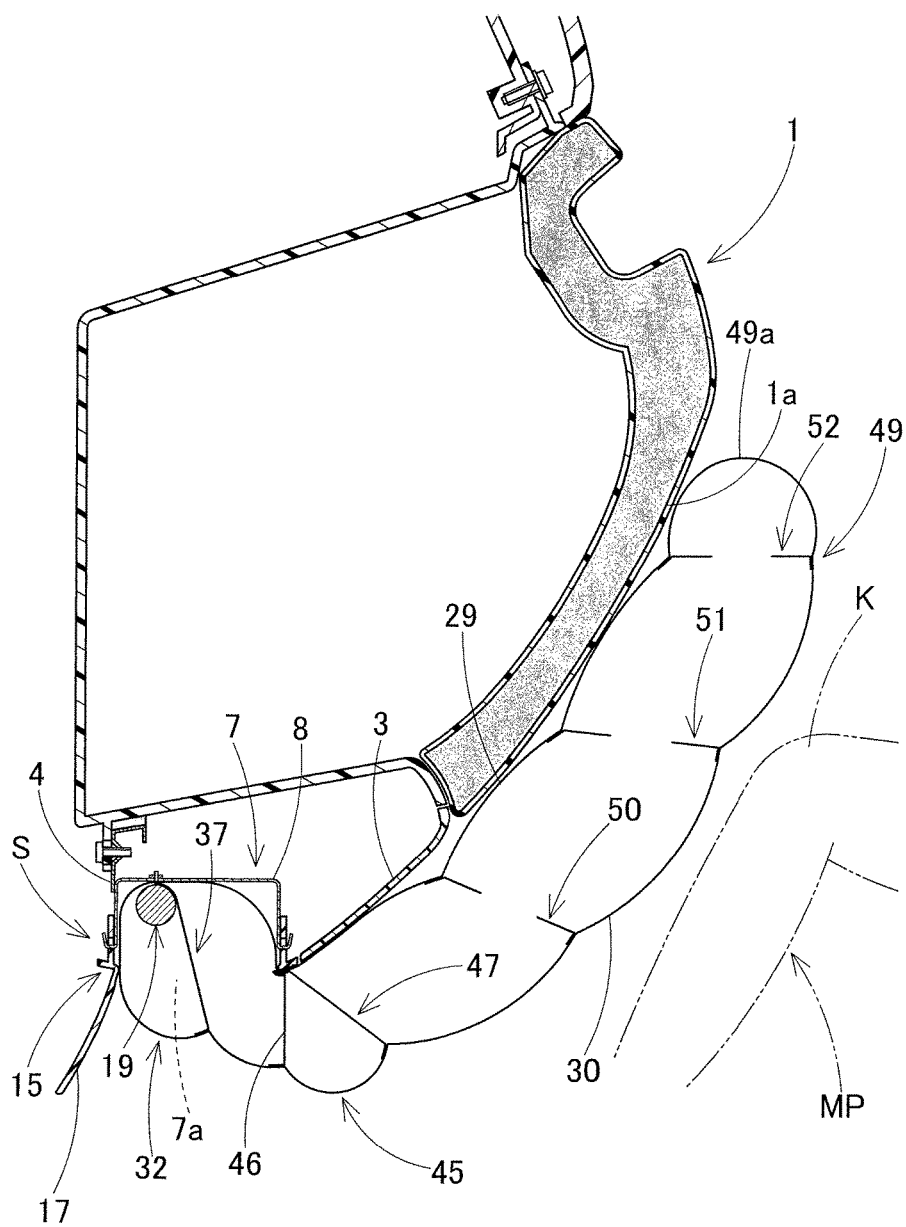
FIG. 11 is a schematic vertical section of the airbag device of FIG. 1 taken along a front and rear direction as the airbag is fully deployed.
Figure 12:
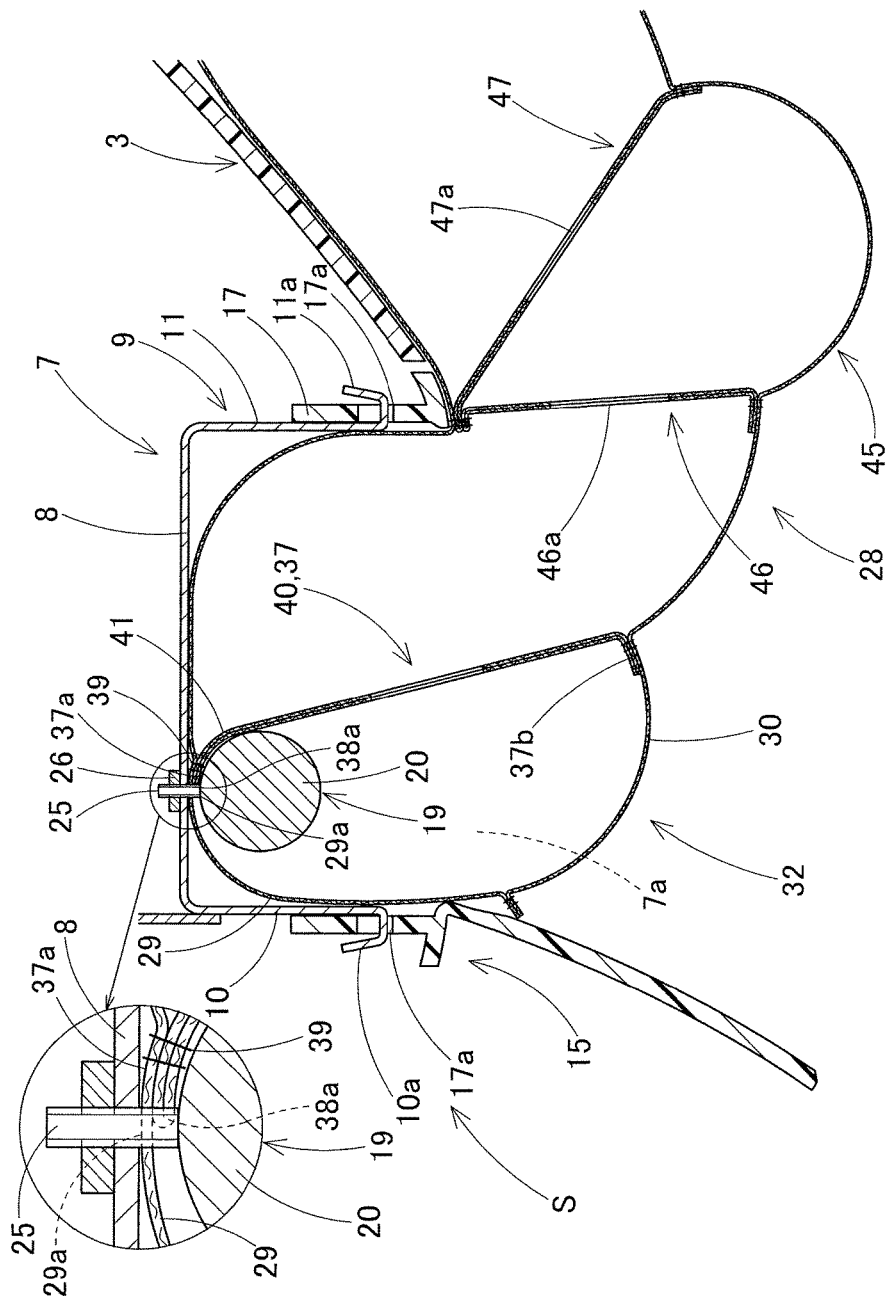
FIG. 12 is a partial enlarged view of FIG. 11 showing the mounting inflatable region.

As shown in FIGS. 1 and 2, the case 7 is located on the underside of the glove box 1 so as to be located in front of and below knees K of a passenger MP as a vehicle occupant. The case 7 is made of sheet metal and is formed into a generally box. The airbag emergence opening 7a, out of which the airbag 28 emerges at deployment, is located at the bottom end region of the case 7. Specifically, the case 7 includes a generally square tubular circumferential wall 9 and a ceiling wall 8 that is formed into a rectangular plate and closes off the top of the circumferential wall 9. The lower end region of the circumferential wall 9 serves as the airbag emergence opening 7a. The circumferential wall 9 is so designed that its length direction extends generally in a left and right direction and its axial direction extends generally along an up and down direction. As shown in FIGS. 2 and 12, the ceiling wall 8 is provided, proximate the front end, two mounting holes 8a for receiving mounting bolts (serving as mounting means) 25 of the inflator 19. As shown in FIG. 12, the circumferential wall 9 is provided, on each of the front wall 10 and rear wall 11 opposing in a front and direction, with a plurality of hooks 10a and 11a engageable with peripheral edges of later-described retaining holes 17a of the side wall 17 of the airbag cover 15. The hooks 10a and 11a are arranged along a left and right direction of the front wall 10 and rear wall 11. The right wall 13 of the circumferential wall 9 is provided, in a vicinity of the front end, with a through hole 13a for receiving the right end 20b of the inflator 19 having a connection port 22, as shown in FIG. 2. The airbag device S of the embodiment is mounted in front of the front passenger seat of a left-hand drive vehicle although not depicted in the drawings, and therefore, the right wall 13 is disposed at an outboard side in a width direction of the vehicle. As shown in FIGS. 1 and 11, the case 7 is secured to the vehicle body structure by being connected with brackets 4 extending from the underside of the front end region of the glove box 1. Further, in the illustrated embodiment, the case 7 is covered with an undercover 3 extending in a continuous fashion from the glove box 1 by the rear side, as shown in FIGS. 1 and 12.

As shown in FIG. 2, in the airbag device S of the illustrated embodiment, the inflator 19 is located at a right region of and inside the case 7. More specifically, the width in a left and right direction of the case 7 is about twice the length of a later-described body 20 of the inflator 19. The width in a left and right direction of the case 7 is generally identical to that of the front edge 32c of a mounting inflatable region 32 of the airbag 28 as described later.

The airbag cover 15 is fabricated of synthetic resin such as thermoplastic elastomer of polyolefin and covers the airbag emergence opening 7a of the case 7. More specifically, the airbag cover 15 includes a door 16 which covers the emergence opening 7a and is openable forward upon deployment of the airbag 28, and a side wall 17 extending upward from the peripheral edge of the door 16 in such a manner as to surround the circumferential wall 9 of the case 7. Regions of the side wall 17 opposed in a front and rear direction are provided with retaining holes 17a for receiving the hooks 10a and 11a of the case 7 to be retained by the hooks 10a and 11a, as shown in FIG. 12.

Referring to FIG. 2, the inflator 19 includes a generally cylindrical body 20 and a mounting bolt (mounting means) 25 protruding out of an outer circumference of the body 20 in a direction perpendicular to an axial direction of the inflator 19. The body 20 is provided, on the first end of an axial direction (i.e., on the left end 20a, in the illustrated embodiment), with a plurality of gas discharge ports 21 for emitting an inflation gas, and on the second end (i.e., on the right end 20b), with a connection port 22 to which a connector 23 connected with a lead wire 24 extending from an airbag actuation circuit is connected. In the illustrated embodiment, two of the mounting bolts 25 are arranged along the axial direction of the body 20 (i.e., along a left and right direction). The inflator 19 is housed inside the airbag 28 such that the bolts 25 protrude out of later-described mounting holes 29a of the airbag 28 and the right end 20b or connection port 22 protrudes out of a later-described insert hole 29b of the airbag 28. The length of the body 20 is so configured that the gas discharge ports 21 are located generally at the center in a left and right direction of a later-described mounting inflatable region 32 of the airbag 28 as the inflator 19 is housed inside the airbag 28, as indicated with double-dotted lines in FIG. 3. The inflator 19 thus housed in the airbag 28 is set in the case 17 such that the right end 20b or connection port 22 protrudes out of the through hole 13a of the right wall 13 of the case 7 and the mounting bolts 25 protrude out of the ceiling wall 8 of the case 7, and then the mounting bolts 25 are fastened with nuts 26. Thus the inflator 19 and airbag 28 are mounted on the case 7. As shown in FIG. 2, a large space A is formed between the left wall 12 of the case 7 and the left end 20a of the inflator 19 with the gas discharge ports 21 as secured to the case 7. The space A is generally as large as the length of the body 20 of the inflator 19. That is, the inflator 19 of the illustrated embodiment is disposed in a generally right half area of the case 7 in a vicinity of the front end (in a vicinity of the front wall 10) of the case 7. In other words, only a right half area of the front end region of the mounting inflatable region 32 of the airbag 28 is supported by the inflator body 20 at airbag deployment.

The airbag 28 is formed of a flexible fabric woven of polyester, polyamide yarns or the like. The airbag 28 is inflatable with an inflation gas, and is designed to emerge out of the case 7 and deploy upward between the knees K of a passenger MP seated in the front passenger seat and the glove box 1. Moreover, the airbag 28 is designed to be deployed along the rear plane 1a of the glove box 1 in front of the knees K of the passenger MP as shown in FIG. 1 (double-dotted lines) and FIG. 11.

Figure 3:
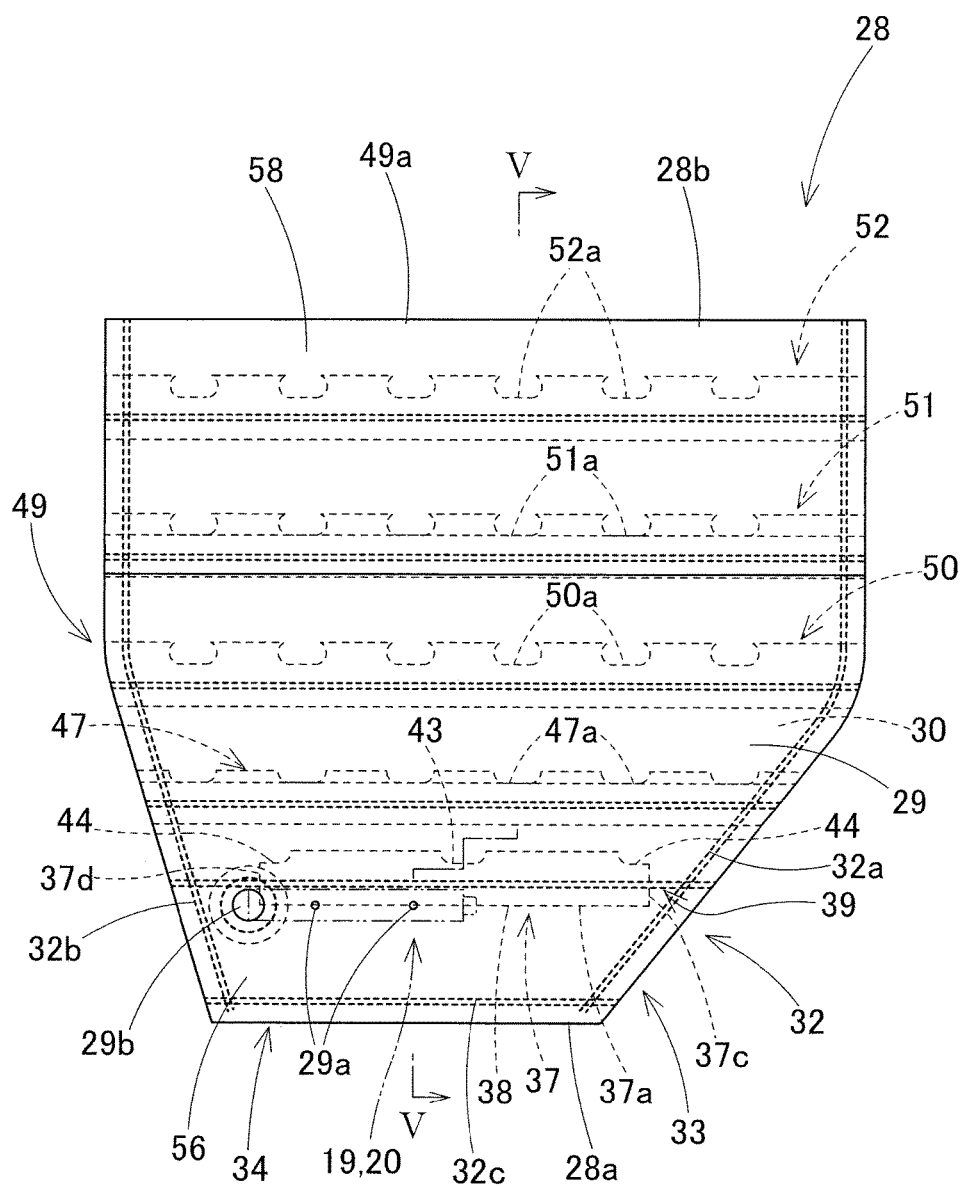
FIG. 3 is a rear view of an airbag for use in the airbag device of FIG. 1 as unfolded and flattened.
Figure 4:
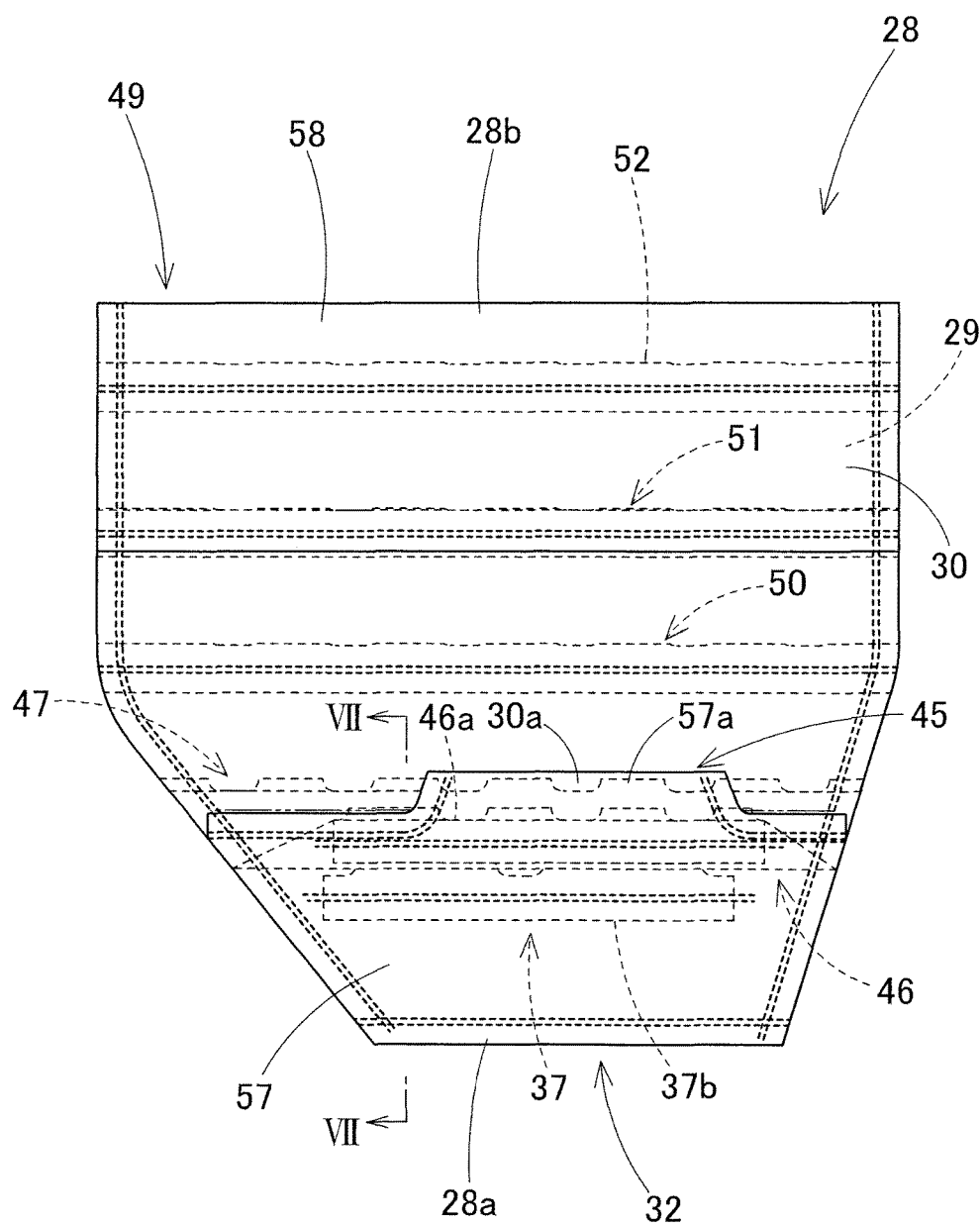
FIG. 4 is a front view of the airbag of FIG. 3.

Referring to FIGS. 3, 4 and 11, the airbag 28 includes a mounting inflatable region 32 that is located at the lower end 28a region of the airbag 28 as deployed and is secured to the case 7 and a knee-protection region 49 that extends upward and rearward from the mounting inflatable region 32 for protecting knees K of the passenger MP. As shown in FIGS. 3 and 4, the knee-protection region 49 is greater in width in a left and right direction than the mounting inflatable region 32 for protecting both knees K of the passenger MP. The airbag 28, in an unfolded and flattened state, has such an outer contour that the knee-protection region 49 protrudes farther towards the left than towards the right, thus the center in a left and right direction of the knee-protection region 49 is located farther towards the left than the center in a left and right direction of the mounting inflatable region 32. The airbag 28 of the illustrated embodiment includes a pair of panels having generally identical contours; a vehicle body side panel 29 deployable towards the glove box 1 (i.e., towards the vehicle body structure) and an occupant side panel 30 deployable toward the passenger MP (FIGS. 3 to 7), and is formed into a bag by connecting (sewing) peripheral edges of the vehicle body side panel 29 and occupant side panel 30 together.

The mounting inflatable region 32 includes a region inflatable inside the case 7 and a region inflatable below the case 7, and is formed into a generally trapezoid tapering towards the front end 32c in a flattened state. The mounting inflatable region 32 includes two mounting holes 29a for receiving the mounting bolts 25 of the inflator 19 and an insert hole 29b for receiving the right end 20b of the inflator 19 on the vehicle body side panel 29, as shown in FIGS. 2 and 3. In the illustrated embodiment, the insert hole 29b is formed proximate the right edge 32b of the mounting inflatable region 32 and the mounting holes 29a are formed on the right side of the center in a left and right direction of the mounting inflatable region 32.

Figure 5:
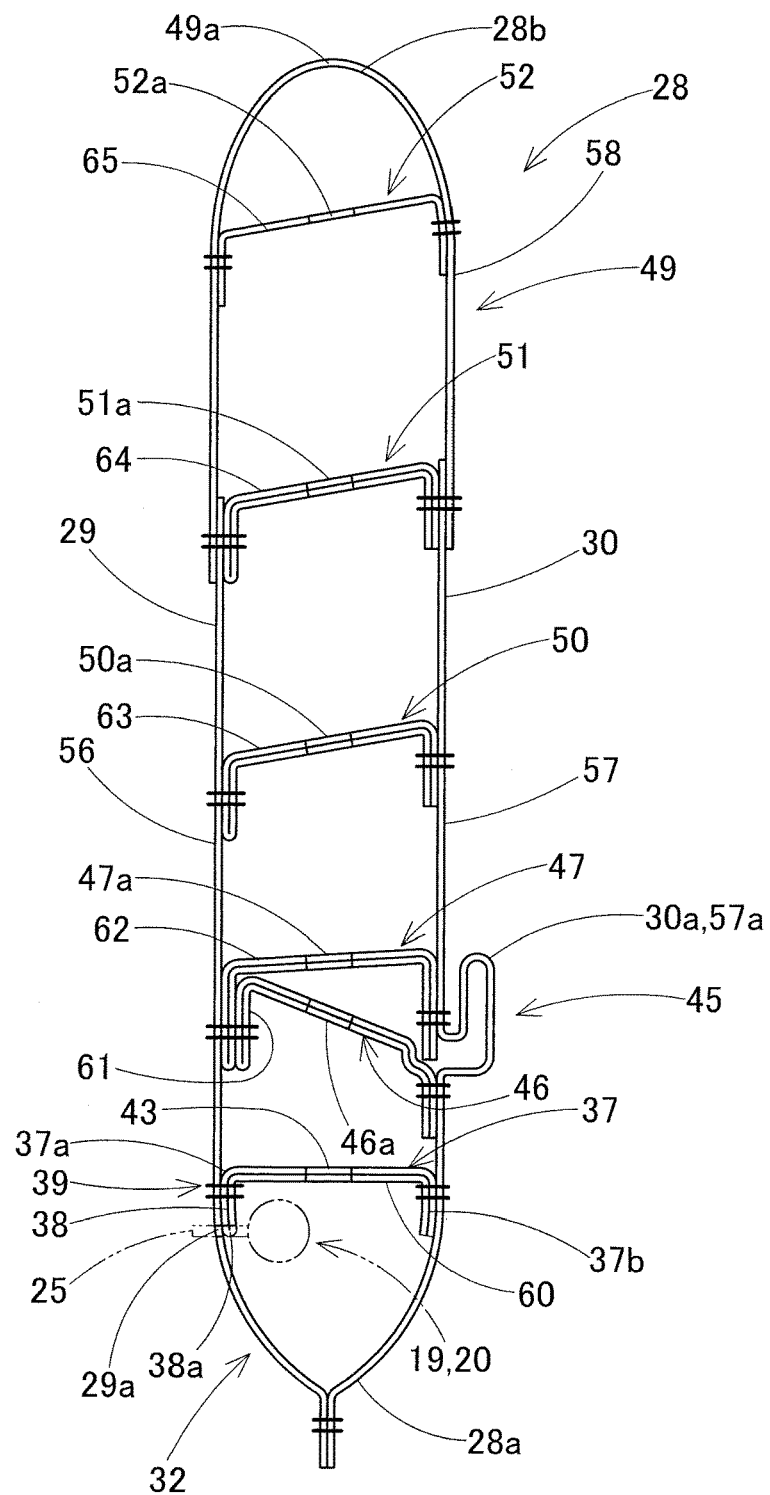
FIG. 5 is a schematic vertical section taken along line V-V of FIG. 3.
Figure 6:
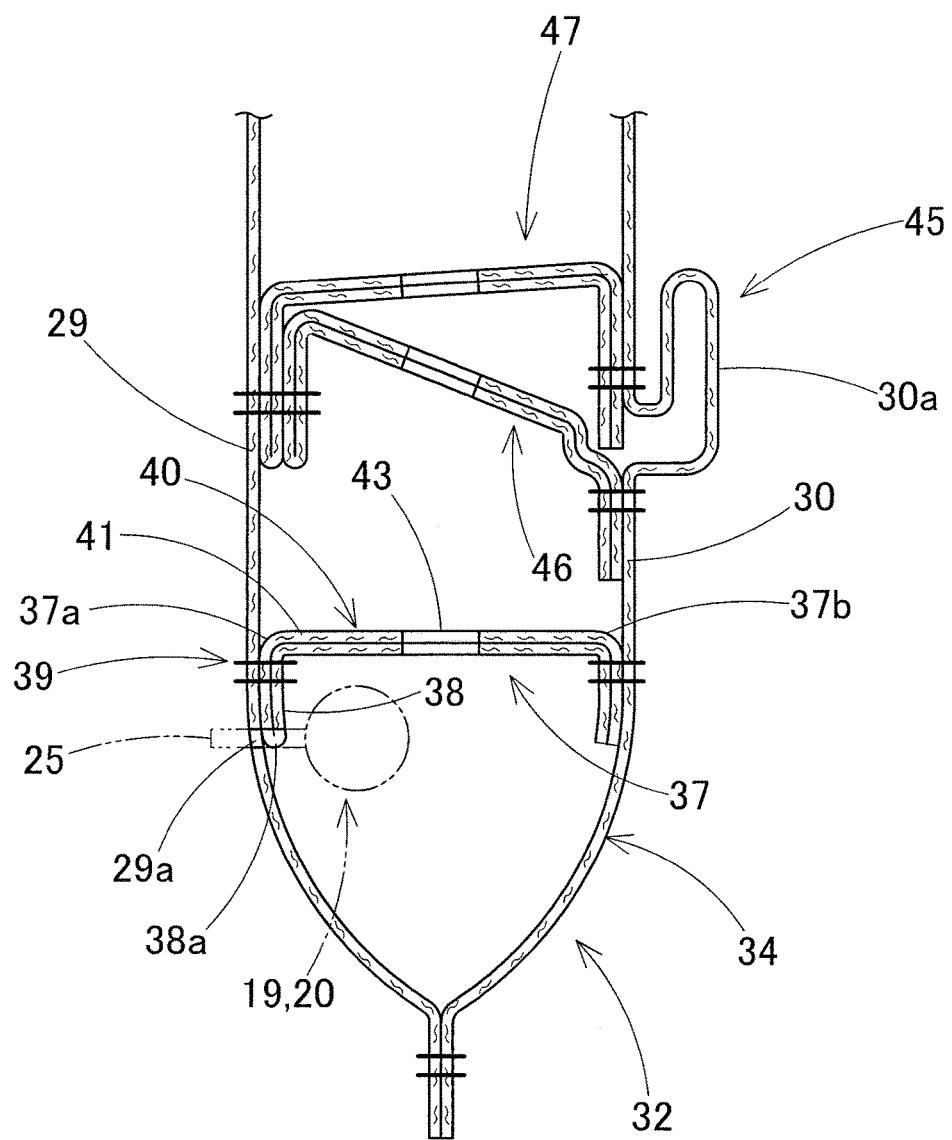
FIG. 6 is a partial enlarged view of FIG. 5 showing a mounting inflatable region.
Figure 8:
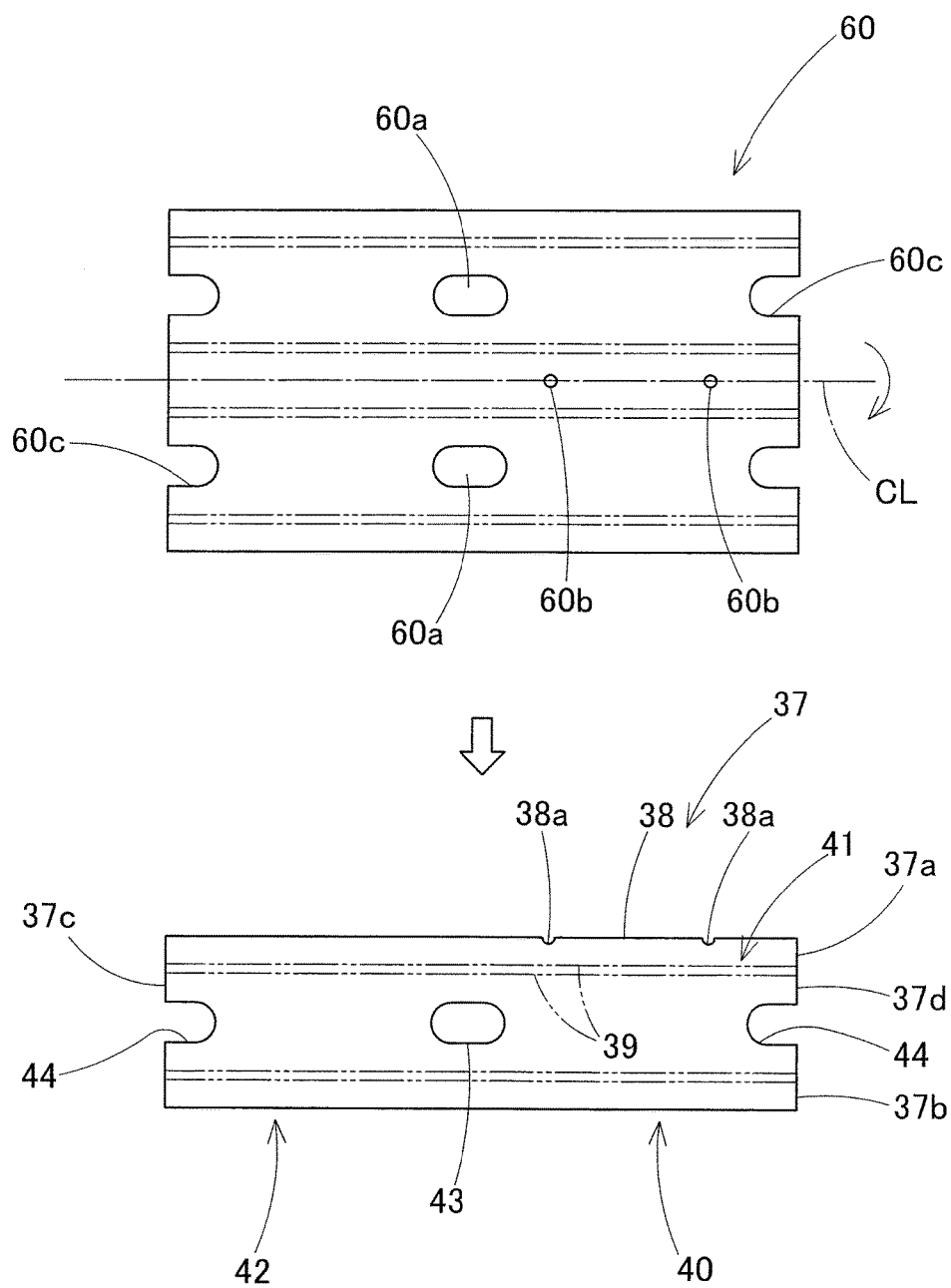
FIG. 8 depicts a base cloth for forming a tether for use in the airbag of FIG. 3 and the tether formed by folding the base cloth in half, by plan views.

The mounting inflatable region 32 internally includes a tether 37 which connects the vehicle body side panel 29 and occupant side panel 30 for regulating a clearance between the vehicle body side panel 29 and occupant side panel 30 at airbag deployment. The tether 37 is formed into a band extending generally in a left and right direction. As shown in FIGS. 3 to 6, a first end in a width direction (i.e., the upper end) 37a of the tether 37 is joined to the vehicle body side panel 29 generally entirely while a second end in the width direction (i.e., the lower end) 37b of the tether 37 is joined to the occupant side panel 30 generally entirely, such that the tether 37 is disposed over a generally entire area in a left and right direction of the mounting inflatable region 32. As shown in FIGS. 11 and 12, the tether 37 is designed to be deployed at the rear of the inflator 19 in such a manner as to protrude out of the case 7 within an area immediately below the case 7 in a front and rear direction. More specifically, as shown in FIGS. 3 and 4, in a flattened state of the airbag 28, the right end 37d of the tether 37 is located proximate to the insert hole 29b of the vehicle body side panel 29 and the left end 37c is located in such a proximity to the left edge 32a of the mounting inflatable region 32 as to leave a small gap between the left end 37c and the left edge 32a. As shown in FIG. 12, the tether 37 is designed to be deployed generally vertically at airbag deployment. The upper end 37a of the tether 37 is sewn to the vehicle body side panel 29 over an entire area in a left and right direction with a sewing thread while the lower end 37b is sewn to the occupant side panel 30 over an entire area in a left and right direction with a sewing thread. As shown in FIG. 8, more specifically, the tether 37 is formed of a base cloth 60 in the form of a generally band. The base cloth 60 is folded in half in a width direction on a crease CL, thus formed into the tether 37. The base cloth 60 includes two apertures 60b for receiving the mounting bolts 25 of the inflator 19 on the crease CL. The part of the tether 37 where the crease CL is located serves as the upper end 37a and is sewn to the vehicle body side panel 29 with a seam 39. That is, as shown in FIG. 6, the tether 37 includes, at the upper edge 38 which is located farther to the end edge than the seam 39, two semicircular openings 38a disposed to match the mounting holes 29a of the vehicle body side panel 29 for receiving the mounting bolts 25.

Since the mounting bolts 25 of the inflator 19 are put through the openings 38a, at airbag deployment, peripheral areas of the openings 38a will be clamped between the ceiling wall 8 of the case 7 (i.e., an inner plane of the case 7) and an outer circumference of the inflator body 20. Thus the upper end 37a region (i.e., a region from the upper edge 38 to the lower side of the seam 39) of a right region 40 (FIG. 8) of the tether 37 where the inflator 19 is located will be brought into contact with an outer circumference of the body 20 of the inflator 19 and supported directly by the inflator body 20 as shown in FIG. 12. This region, i.e., the upper end 37a region of the right region 40 of the tether 37, will be called a supported region 41 hereinafter.

Figure 13:
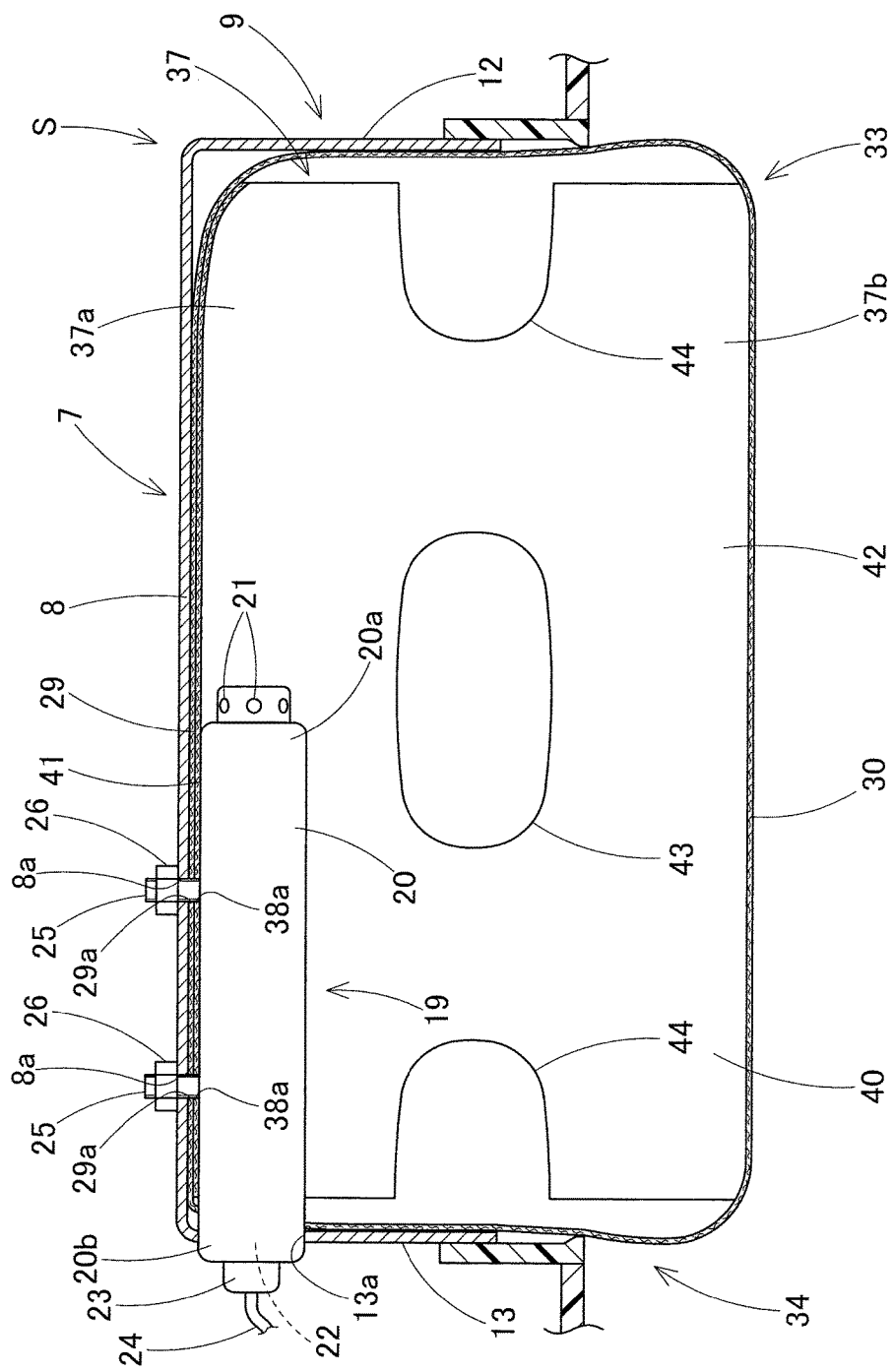
FIG. 13 is a schematic vertical section of the airbag device of FIG. 1 taken along a left and right direction in a vicinity of the mounting inflatable region and viewed from the rear of the vehicle, as the airbag is fully deployed.

As shown in FIGS. 8 and 13, the tether 37 further includes a generally oval gas communication hole 43 generally at the center in a left and right direction, and generally half oval recessed regions 44 at the left end 37c and right end 37d, both for providing gas communication. An opening area of the gas communication hole 43 and a depth of each of the recessed regions 44 (i.e., a clearance between the bottom of the recessed region 44 and the left edge 32a/right edge 32b of the mounting inflatable region 32) are so small that a region of the mounting inflatable region 32 in front of the tether 37 (or a region defined by the mounting inflatable region 32 and the tether 37) will be inflated into a rod shape extending generally in a left and right direction in an initial stage of airbag deployment.

As shown in FIGS. 4, 11 and 12, the airbag 28 of the illustrated embodiment further includes an auxiliary inflatable region 45 on the occupant side panel 30 at the rear of the mounting inflatable region 32. The auxiliary inflatable region 45 is designed to be deployed at the rear and in a vicinity of the case 7 in such a manner as to protrude downward, to serve as a point at which the airbag 28 bends upward so as to be deployed along the rear plane 1a of the glove box 1 and such that the leading end (upper end 49a) of the knee-protection region 49 is directed upward, because the airbag 28 is configured to protrude once downward after emerging out of the emergence opening 7a of the case 7. More specifically, the auxiliary inflatable region 45 is formed by providing an excess region 30a in the occupant side panel 30, connecting later-described partitioning tethers 46 and 47 to the front and rear ends of the excess region 30a, tucking the excess region 30a and joining (sewing) leading ends of the partitioning tethers 46 and 47 together to the vehicle body side panel 29 as shown in FIG. 5. That is, the film length of the occupant side panel 30, which is deployable facing away from the glove box 1, is longer than that of the vehicle body side panel 29 by the length of the excess region 30a, which allows the airbag 28 to bend at the point of the vehicle body side panel 29 to which the leading ends of the partitioning tethers 46 and 47 extending from the front and rear ends of the excess region 30a are connected.

Figure 7:
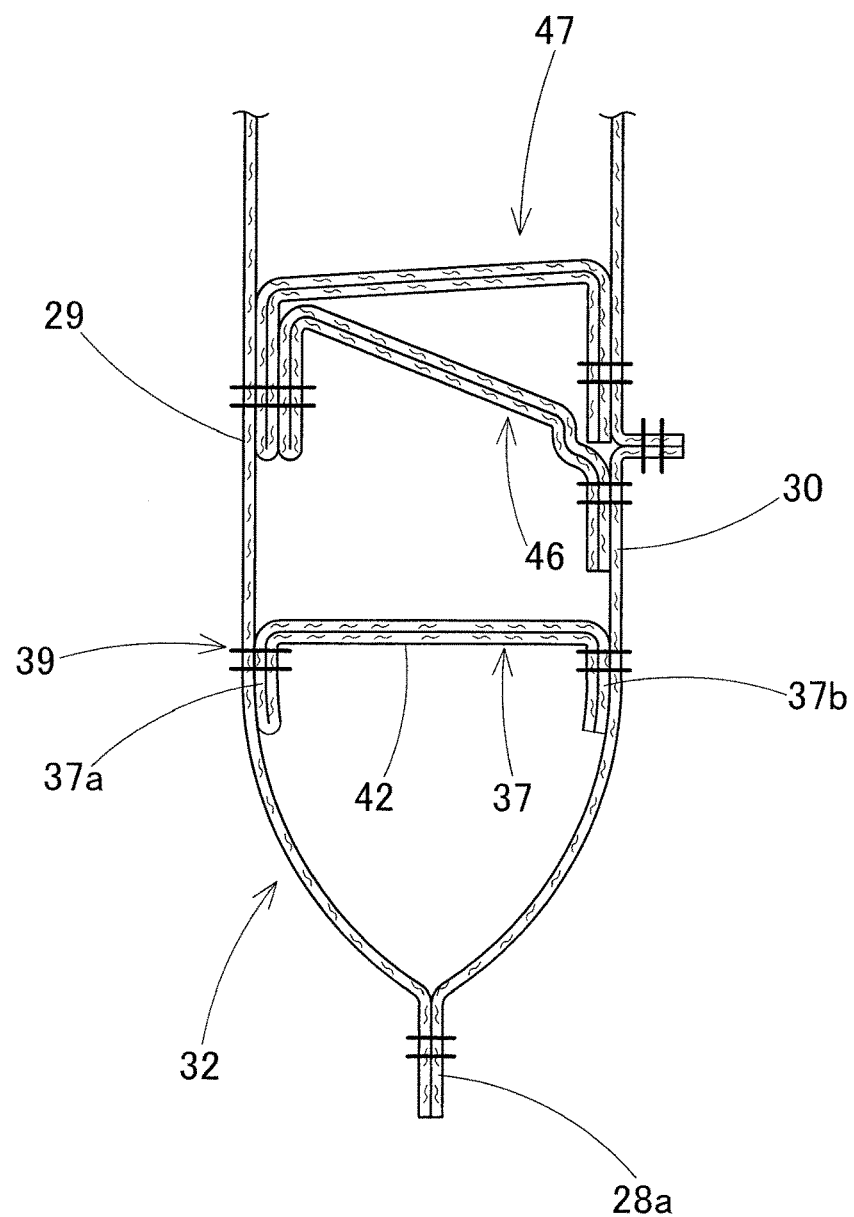
FIG. 7 is a schematic partial enlarged vertical section taken along line VII-VII of FIG. 4.

In the illustrated embodiment, the width in a left and right direction of the auxiliary inflatable region 45 is smaller than the width in a left and right direction of the front edge 32c of the mounting inflatable region 32, and the auxiliary inflatable region 45 is generally trapezoidal in shape in a flattened state and protrudes partially out of the occupant side panel 30, as shown in FIG. 4. The width in a left and right direction of the partitioning tether 46, which is disposed in front of the auxiliary inflatable region 45, is generally coincident with that of the auxiliary inflatable region 45, while the partitioning tether 47, which is located at the rear of the auxiliary inflatable region 45, has a greater width in a left and right direction than the partitioning tether 46, and is disposed over a generally entire area in a left and right direction of the airbag 28. Each of the partitioning tethers 46 and 47 is formed by folding later-described base cloth 61/62 (FIG. 10) in half in a width direction. Each of the partitioning tethers 46 and 47 is provided with gas communication holes 46a/47a for providing gas communication. More particularly, the partitioning tether 46 disposed in front of the auxiliary inflatable region 45 includes three gas communication holes 46a along a left and right direction while the partitioning tether 47 located at the rear of the auxiliary inflatable region 45 includes six gas communication holes 47a along a left and right direction. In the illustrated embodiment, on the left and right sides of the auxiliary inflatable region 45, the occupant side panel 30 is formed by sewing opposing edges of a later-described base cloth 57 (FIG. 9) together directly as shown in FIG. 7.

Referring to FIGS. 3 to 5, the airbag 28 further includes inside the knee-protection region 49 three thickness regulating tethers 50, 51 and 52 each of which connects the vehicle body side panel 29 and occupant side panel 30 for regulating the thickness of the knee-protection region 49 at airbag deployment. The tethers 50, 51 and 52 are disposed one above another inside the knee-protection region 49 in such a manner as to extend along a left and right direction. In the illustrated embodiment, each of the thickness regulating tethers 50, 51 and 52 is disposed over a generally entire area in a left and right direction of the knee-protection region 49. The thickness regulating tethers 50 and 51 except the tether 52 located uppermost are each formed by folding later-described base cloths 63 and 64 (FIG. 10) in half in a width direction. Each of the thickness regulating tethers 50, 51 and 52 includes six gas communication holes 50a, 51a and 52a for providing gas communication, along a left and right direction. In the illustrated embodiment, in order that each of the thickness regulating tethers 50, 51 and 52 is deployed generally horizontally (FIG. 11), joints to the occupant side panel 30 of the tethers 50, 51 and 52 are formed on the upper side than joints to the vehicle body side panel 29 as shown in FIG. 5.

Figure 9:
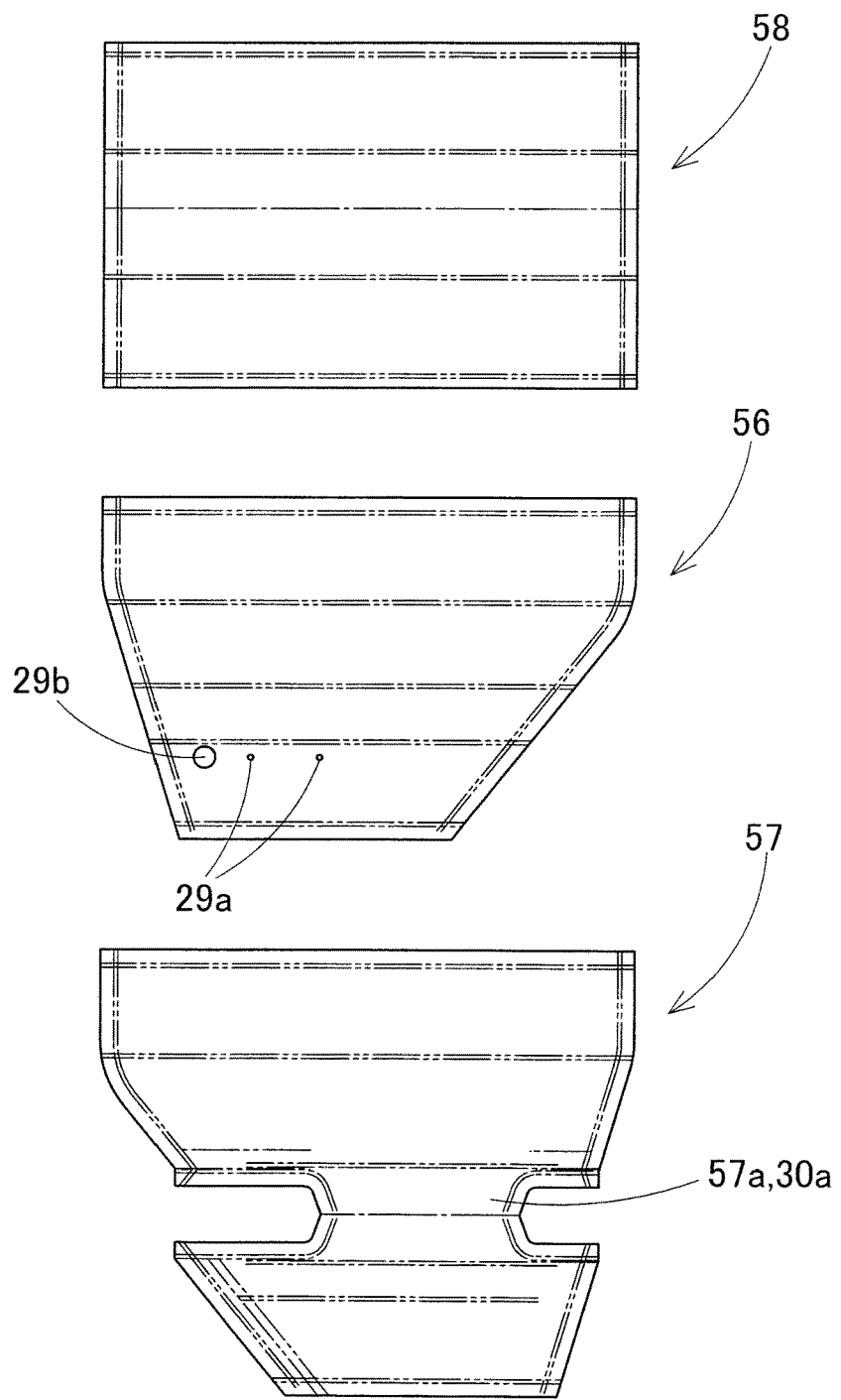
FIG. 9 depicts base members for forming the airbag of FIG. 3 by plan views.
Figure 10:
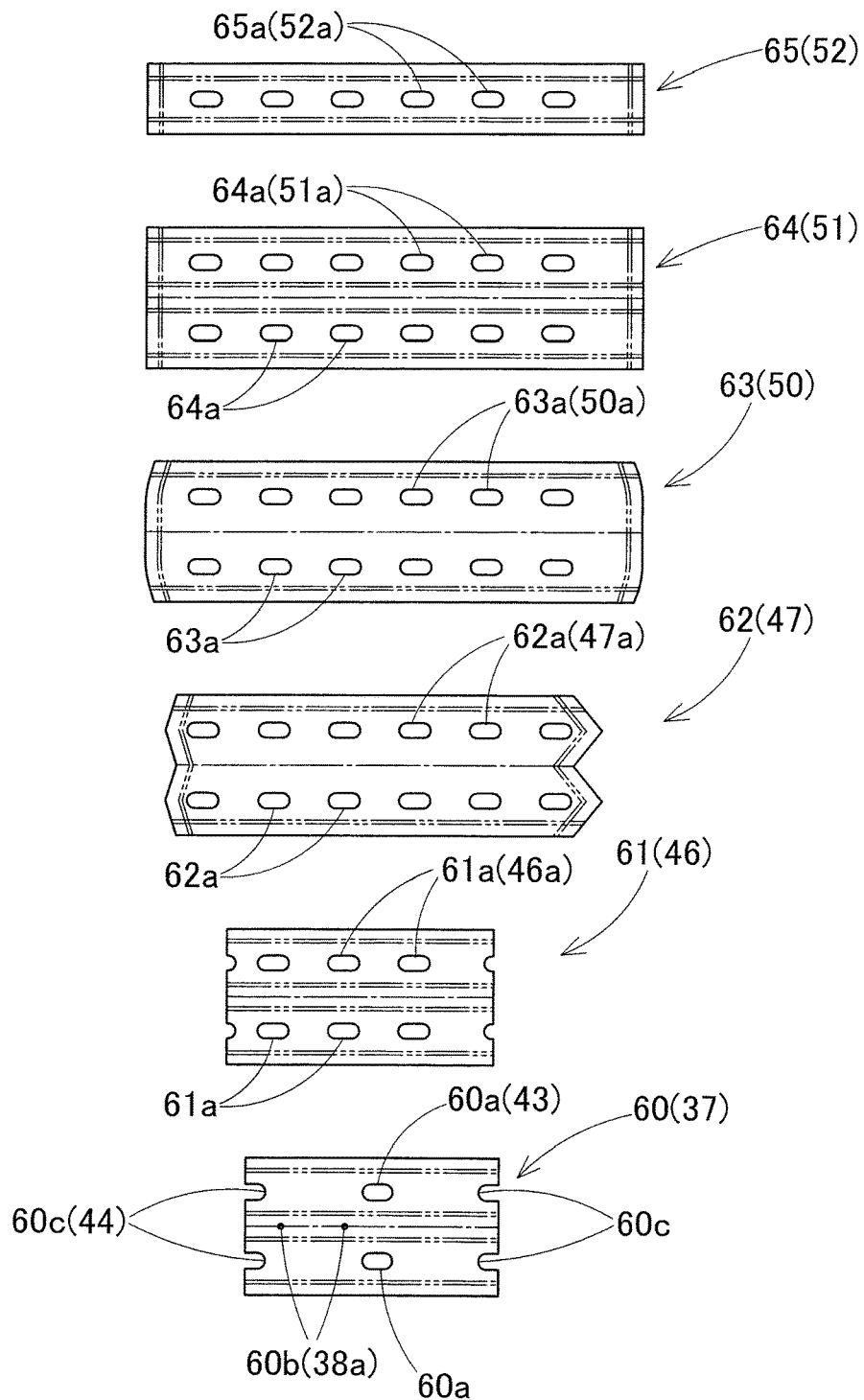
FIG. 10 depicts base cloths for forming various tethers disposed inside the airbag of FIG. 3 by plan views.

The airbag 28 is composed of a plurality of base cloths of a woven fabric of polyester, polyamide yarns or the like and cut in predetermined shapes, i.e., three base cloths 56, 57 and 58 for forming the vehicle body side panel 29 and occupant side panel 30, and six base cloths 60, 61, 62, 63, 64 and 65 for forming the tethers as shown in FIGS. 9 and 10. The airbag 28 is formed by sewing these base cloth together using sewing threads.

The base cloth 56 forms a region of the vehicle body side panel 29 from the mounting inflatable region 32 to the location of the central thickness regulating tether 51 in the knee-protection region 49 (i.e., a region of the vehicle body side panel 29 on the lower side of the tether 51), see FIG. 5. The base cloth 57 forms a region of the occupant side panel 30 from the mounting inflatable region 32 to the location of the central thickness regulating tether 51 in the knee-protection region 49 (i.e., a region of the occupant side panel 30 on the lower side of the tether 51). The base cloth 57 includes the excess region 30a for forming the auxiliary inflatable region 45 in a vicinity of the center in an up and down direction. The regions of the base cloth 57 on the left and right sides of the excess region 30a each have a split region. The base cloth 58 forms regions of the vehicle body side panel 29 and occupant side panel 30 of the knee-protection region 49 above the tether 51. Each of the base cloths 60, 61, 62, 63 and 64 is folded in half and forms the tether 37, partitioning tether 46, partitioning tether 47, the thickness regulating tether 50 and thickness regulating tether 51. The base cloth 65 forms the thickness regulating tether 52 in an unfolded state. Each of the base cloths 60, 61, 62, 63, 64 and 65 has openings 60a/61a/62a/63a/64a/65a for forming the gas communication holes 43/46a/47a/50a/51a/52a in advance. As described above, the base cloth 60 for forming the tether 37 further includes apertures 60b for forming the openings 38a for receiving the mounting bolts 25 and cut-out regions 60c for forming the recessed regions 44.

Mounting of the knee-protecting airbag device S on the vehicle is now described. Firstly, the inflator 19 is set inside the airbag 28 such that the right end 20b of the inflator body 20 (i.e., the connection port 22) protrudes out of the insert hole 29b while the mounting bolts 25 protrude out of the mounting holes 29a. At this time, the mounting bolts 25 are passed through the openings 38a of the tether 37 as well. Subsequently, the airbag 28 is folded up to fit in the case 7, and is wrapped by a tearable wrapping member (not-shown) for keeping the folded-up configuration. At this time, the mounting bolts 25 of the inflator 19 and the right end 20b of the inflator body 20 are taken out of the wrapping member. Then the airbag 28 and the inflator 19 are set in the case 7 so the mounting bolts 25 of the inflator 19 and the right end 20b of the inflator body 20 protrude out of the mounting holes 8a and through hole 13a of the case 7. Then the mounting bolts 25 protruding out of the ceiling wall 8 of the case 7 are fastened with the nuts 26, such that the inflator 19 and airbag 28 are mounted on the case 7. At this time, the peripheral areas of the openings 38a in the upper end 37a region of the tether 37 are clamped between the inflator body 20 and ceiling wall 8 of the case 7. Thereafter, the airbag cover 15 is assembled with the case 7 by having the hooks 10a and 11a engaged with peripheral areas of the retaining holes 17a, thus completing an airbag module. This airbag module is mounted on the underside of the glove box 1 with the aid of the brackets 4. In the meantime, the connector 23 provided with a lead wire 24 extending from an airbag actuating circuit is connected with the connection port 22 of the inflator 19 protruding out of the case 7. If then the undercover 3 is mounted, the airbag device S is mounted on the vehicle.

After the airbag device S is mounted on the vehicle, if an actuating signal is fed to the inflator 19 via the lead wire 24, the inflator 19 will emit an inflation gas out of the gas discharge ports 21 into the airbag 28. Then the airbag 28 will inflate and break the wrapping member, push and open the door 16 of the airbag cover 15, and then emerge out of the emergence opening 7a of the case 7 and be deployed rearwardly and upwardly to cover the rear plane 1a of the glove box 1 as shown in FIG. 1 (by double-dashed lines) and FIG. 11, thus completing deployment.

In the knee-protecting airbag device S of the illustrated embodiment, the case 7 is provided with the airbag emergence opening 7a at the lower end region such that the airbag 28 protrudes downward out of the opening 7a in an initial stage of deployment. However, the tether 37 disposed inside the mounting inflatable region 32 of the airbag 28 limits the clearance between the vehicle body side panel 29 and occupant side panel 30 during airbag deployment, such that the mounting inflatable region 32 will be prevented from inflating unduly thick and protruding too downward, and the inflation gas will be directed towards the knee-protection region 49 quickly to deploy the knee-protection region 49 quickly. In addition, since the tether 37 is disposed in such a manner as to connect the vehicle body side panel 29 and occupant side panel 30 inside the mounting inflatable region 32, the tether 37 has a simpler configuration in comparison with conventional knee-protecting airbag devices.

Therefore, the knee-protecting airbag device S of the illustrated embodiment will be capable of deploying the airbag 28 quickly while controlling the contour of the airbag 28 as deployed with a simple configuration.

In the knee-protecting airbag device S of the illustrated embodiment, the upper end 37a region of the tether 37 joined to the vehicle body side panel 29 is supported by the inflator 19 at airbag deployment. More specifically, the mounting bolts 25 of the inflator 19 are put through the openings 38a formed at the upper edge 38a of the tether 37 such that the supported region 41 (i.e., the upper end 37a region of the right region 40) of the tether 37 is directly supported by the body 20 of the inflator 19 while being brought into contact with the body 20 of the inflator 19 as shown in FIG. 12. This configuration will prevent the upper end 37a region of the tether 37 from moving downward and regulate a clearance between the occupant side panel 30 of the mounting inflatable region 32 and case 7 (ceiling wall 8 of the case 7), thus preventing the mounting inflatable region 32 from protruding downward unduly. In the illustrated embodiment, especially, the openings 38a for receiving the mounting bolts 25 of the inflator 19 are formed at the upper end 37a region of the tether 37, and the peripheral areas of the openings 38a are clamped between the inflator body 20 and the ceiling wall 8 of the case 7. Accordingly, the upper end 37a region of the tether 37 will be firmly supported by the inflator 19 and, the upper end 37a region and the vehicle body side panel 29 to which the upper end 37a region is joined will be prevented from slipping downward in an adequate fashion.

Further, in the foregoing embodiment, the tether 37 is formed into a band deployable generally along a left and right direction, and a first end in a width direction (i.e., the upper end) 37a of the tether 37 is joined to the vehicle body side panel 29 entirely while a second end in the width direction (i.e., the lower end) 37b of the tether 37 is joined to the occupant side panel 30 entirely, such that the tether 37 is disposed over a generally entire area in a left and right direction of the mounting inflatable region 32. This configuration will prevent an entire area in a left and right direction of the mounting inflatable region 32 from protruding downward at airbag deployment and help inflate the airbag 28 in a balanced fashion in a left and right direction quickly.

In the foregoing embodiment, although the tether 37 is disposed over a generally entire area in a left and right direction of the mounting inflatable region 32, the left region 42 of the tether 37 distant from the inflator 19 will not be supported by the inflator 19 as shown in FIG. 13, since the inflator 19 is located to the right side of the case 7 in a lopsided fashion. Nevertheless, since the entire upper end 37a of the tether 37 is joined to the vehicle body side panel 29 by the seam 39, the upper end region of the left region 42 will also be pulled towards the inflator 19, thus the left region 42 of the mounting inflatable region 32 will be prevented from protruding downward at airbag deployment.

Moreover, the tether 37 of the foregoing embodiment is designed to be deployable within an area immediately below the case 7 in a front and rear direction. This configuration will further help prevent a region of the mounting inflatable region 32 deployable immediately below the case 7 in a front and rear direction from protruding unduly downward.

Figure 14:
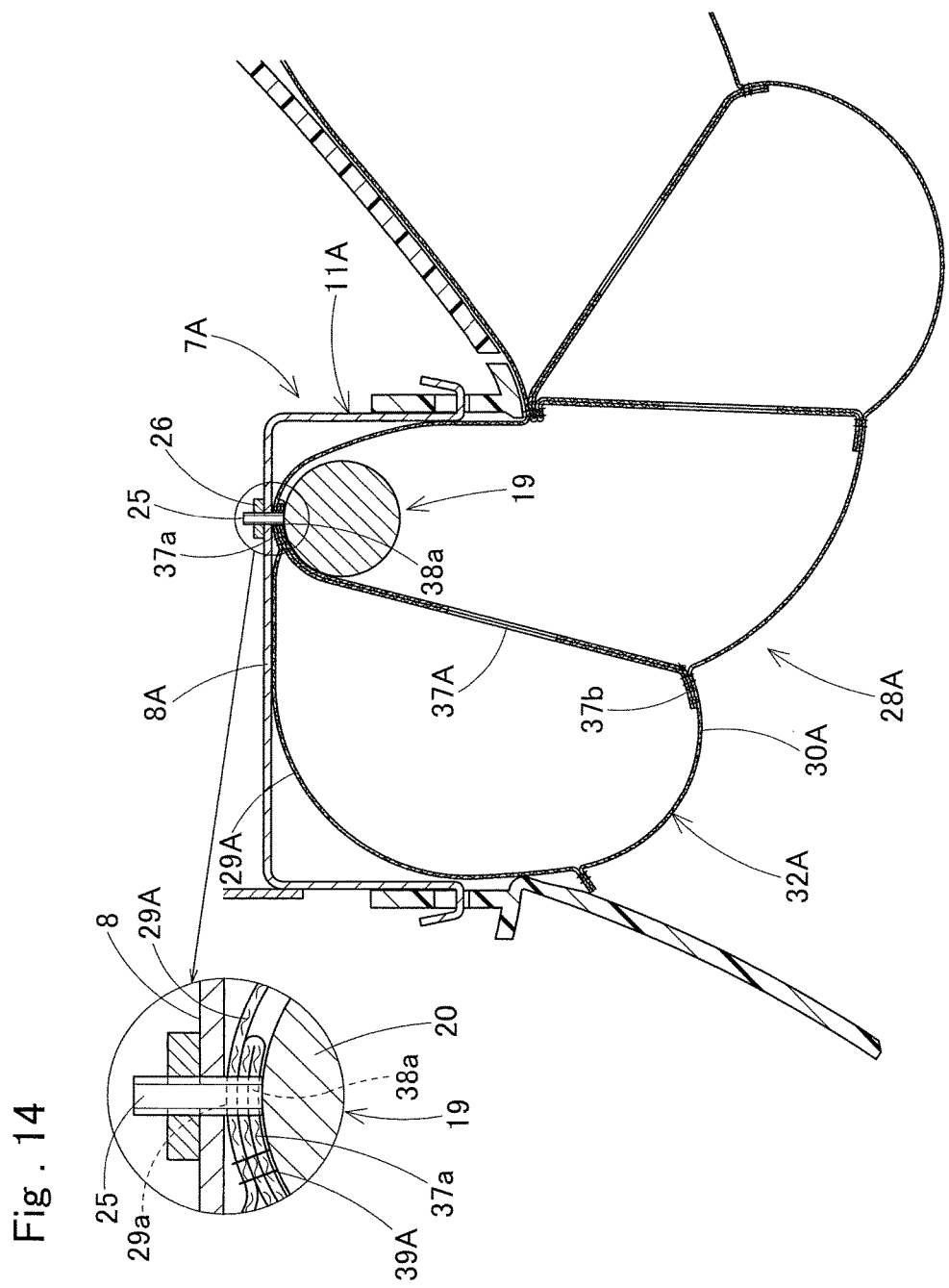
FIG. 14 is a schematic vertical section of a modification of the airbag as fully deployed, taken along a front and rear direction at a mounting inflatable region.

The tether 37 of the foregoing embodiment is deployable at the rear of the inflator 19 since the inflator 19 is housed in the front end region (in a vicinity of the front wall 10) of the case 7. Alternatively, in such an instance where the inflator 19 is housed in a rear end region of a case 7A (in a vicinity of a rear wall 11A) as shown in FIG. 14, a tether 37A may be so disposed as to be deployable in front of the inflator 19. The tether 37A of the airbag 28A shown in FIG. 14 includes round openings 38*a* for receiving mounting bolts 25 at the upper edge such that the upper end 37*a* region is placed on the inflator body 20 and is supported by the inflator 19. The tether 37 of the foregoing embodiment may also be provided with generally round openings, instead of generally semicircular openings, for receiving the mounting bolts 25.

Figure 15:
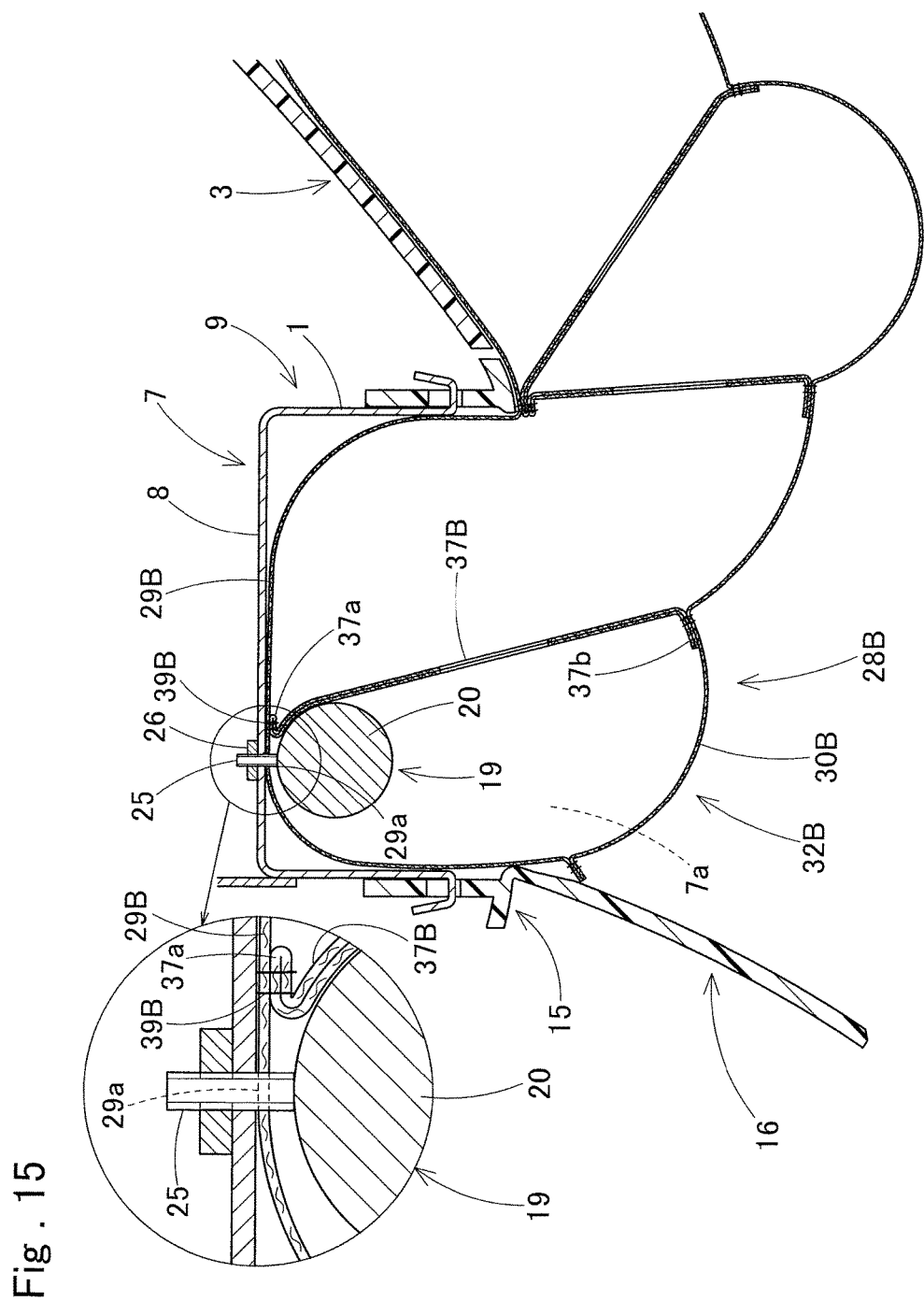
FIG. 15 is a schematic vertical section of another modification of the airbag as fully deployed, taken along a front and rear direction at a mounting inflatable region.
Figure 16:
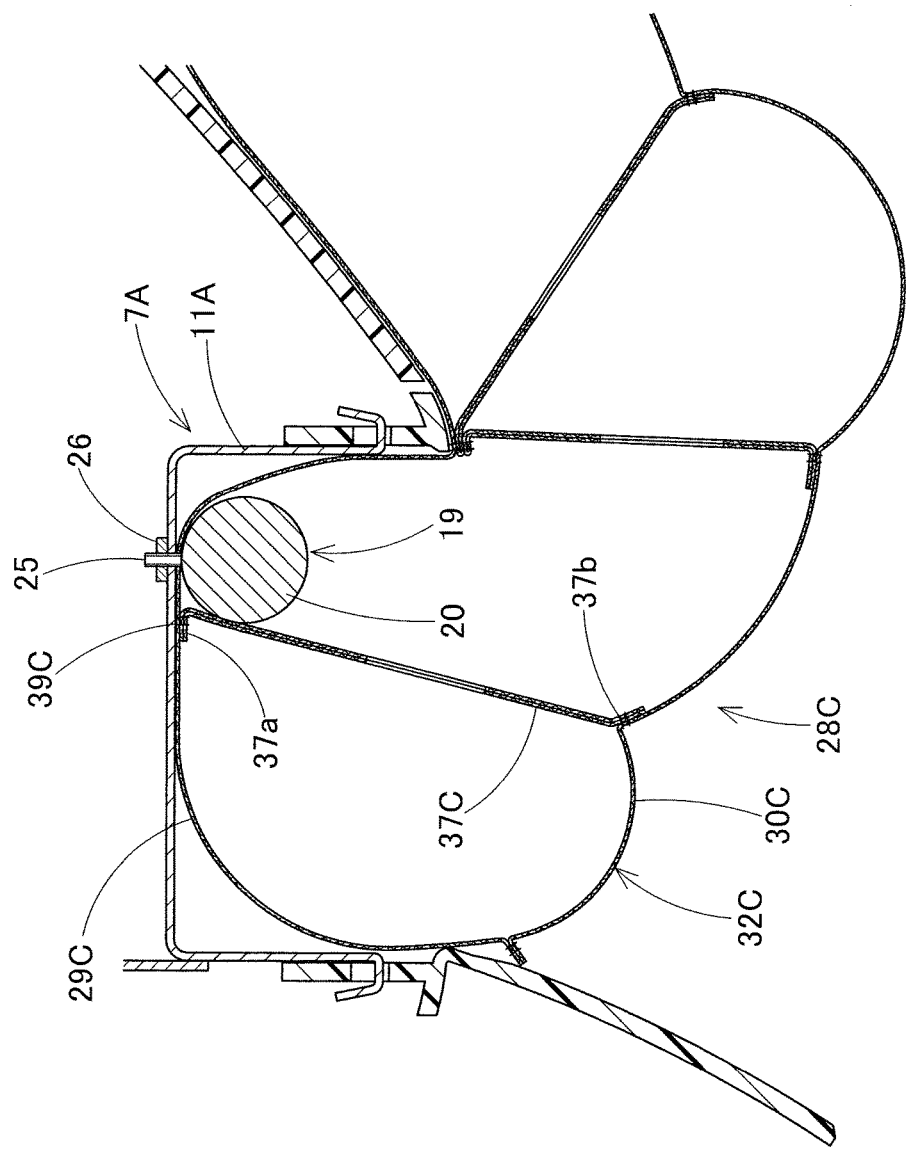
FIG. 16 is a schematic vertical section of yet another modification of the airbag as fully deployed, taken along a front and rear direction at a mounting inflatable region.

In the foregoing embodiment, the tether 37 includes the openings 38*a* for receiving the mounting bolts 25 such that the peripheral areas of the openings 38*a* are clamped between the inflator body 20 and ceiling wall 8 of the case 7 and thus supported by the inflator 19 directly. Alternatively, however, the tether may be so configured as not to let the mounting bolts pass through the tether as long as the tether is supported by the inflator. By way of example, the tether may be configured like a tether 37B shown in FIG. 15. The tether 37B is disposed at the rear of the inflator 19 inside an airbag 28B, and does not include an opening for receiving a mounting bolt. The upper end 37*a* region of the tether 37B is sewn to the vehicle body side panel 29B in a vicinity of and at the rear of the mounting holes 29*a* of the airbag 28B by a seam 39B such that the region of the tether 37B below the seam 39B is brought into contact with and supported by the inflator body 20 at airbag deployment. In an instance where the tether is located in front of the inflator 19, the tether may be configured as a tether 37C shown in FIG. 16. The tether 37C does not include an opening for receiving a mounting bolt. The upper end 37*a* region of the tether 37C is sewn to the vehicle body side panel 29C in a vicinity of and in front of the mounting holes 29*a* of the airbag 28C by a seam 39C such that the region of the tether 37C below the seam 39C is brought into contact with and supported by the inflator body 20 at airbag deployment.

Figure 17:
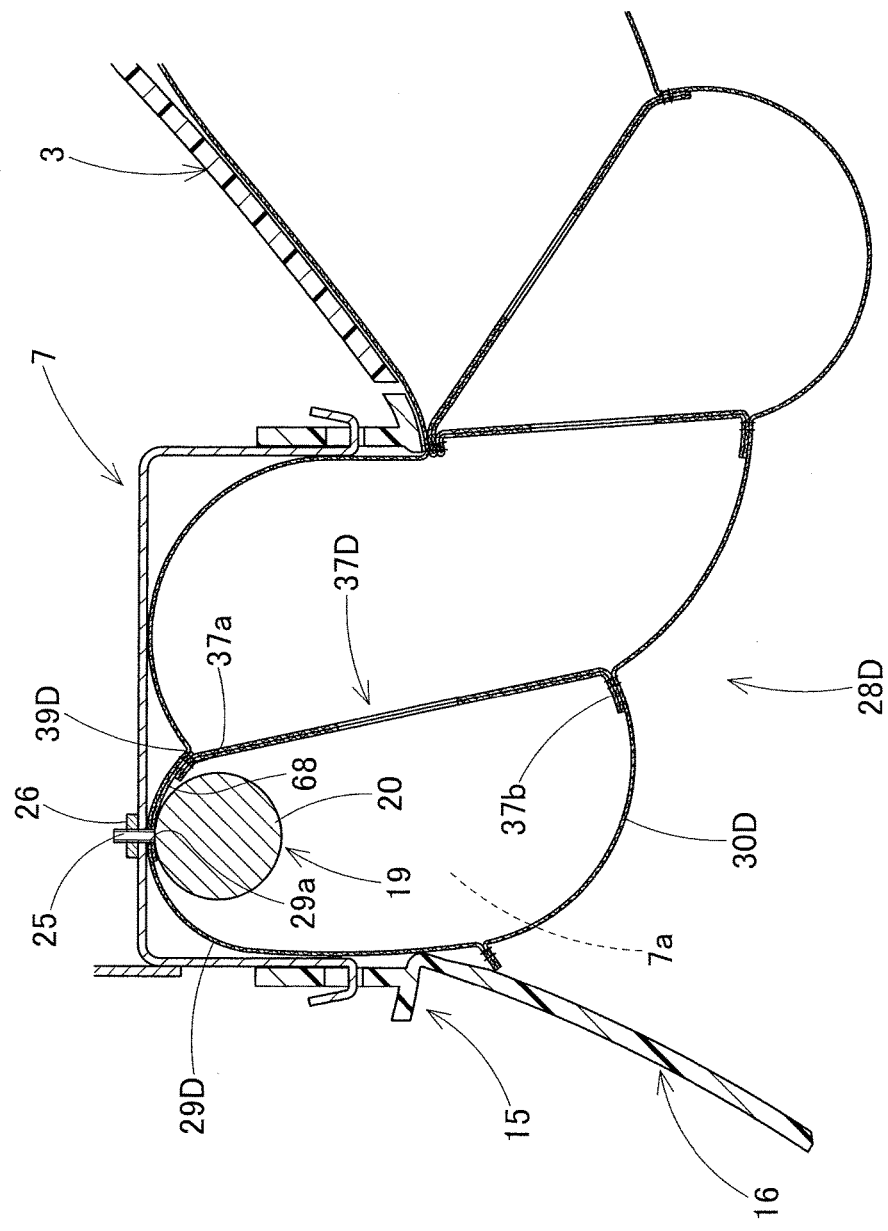
FIG. 17 is a schematic vertical section of yet another modification of the airbag as fully deployed, taken along a front and rear direction at a mounting inflatable region.
Figure 18:
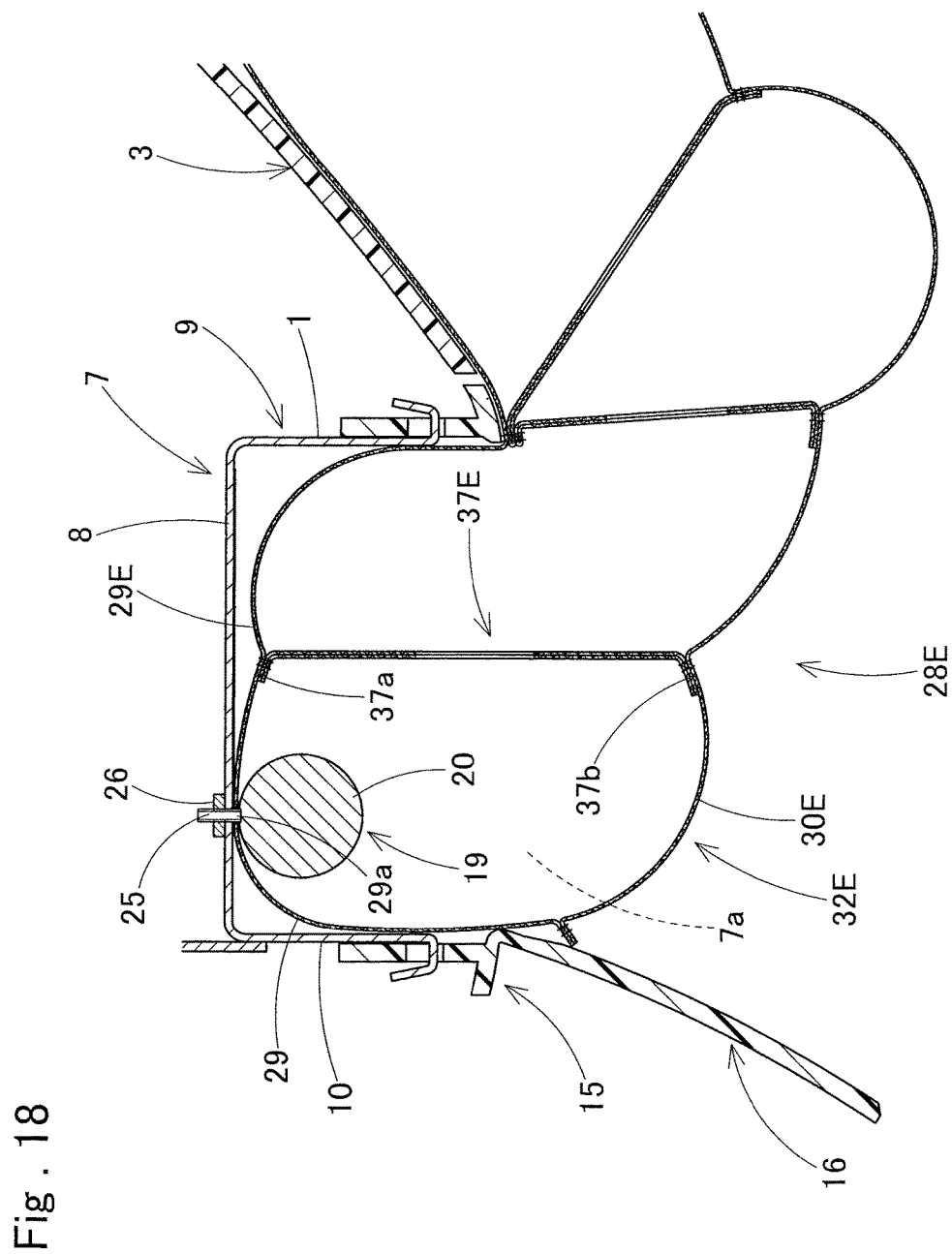
FIG. 18 is a schematic vertical section of yet another modification of the airbag as fully deployed, taken along a front and rear direction at a mounting inflatable region.

Further alternatively, the tether does not necessarily have to be supported by the inflator directly, but may be indirectly supported by the inflator. By way of example, an airbag 28D shown in FIG. 17 includes a reinforcing cloth 68 which extends from a peripheral area of the mounting bolt 25 while being supported by the inflator 19, and the upper end 37*a* region of the tether 37D is sewn to the reinforcing cloth 68 as well as to the vehicle body side panel 29D by a seam 39D at a position distant from the inflator 19, such that the tether 37D is indirectly supported by the inflator 19 by the medium of the reinforcing cloth 68. Furthermore, the tether does not necessarily have to be supported by the inflator directly or indirectly. By way of example, like an airbag 28E depicted in FIG. 18, a tether 37E may be so disposed as to join the vehicle body side panel 29E and occupant side panel 30E at the rear of and at a distance from the inflator 19.

Figure 19:
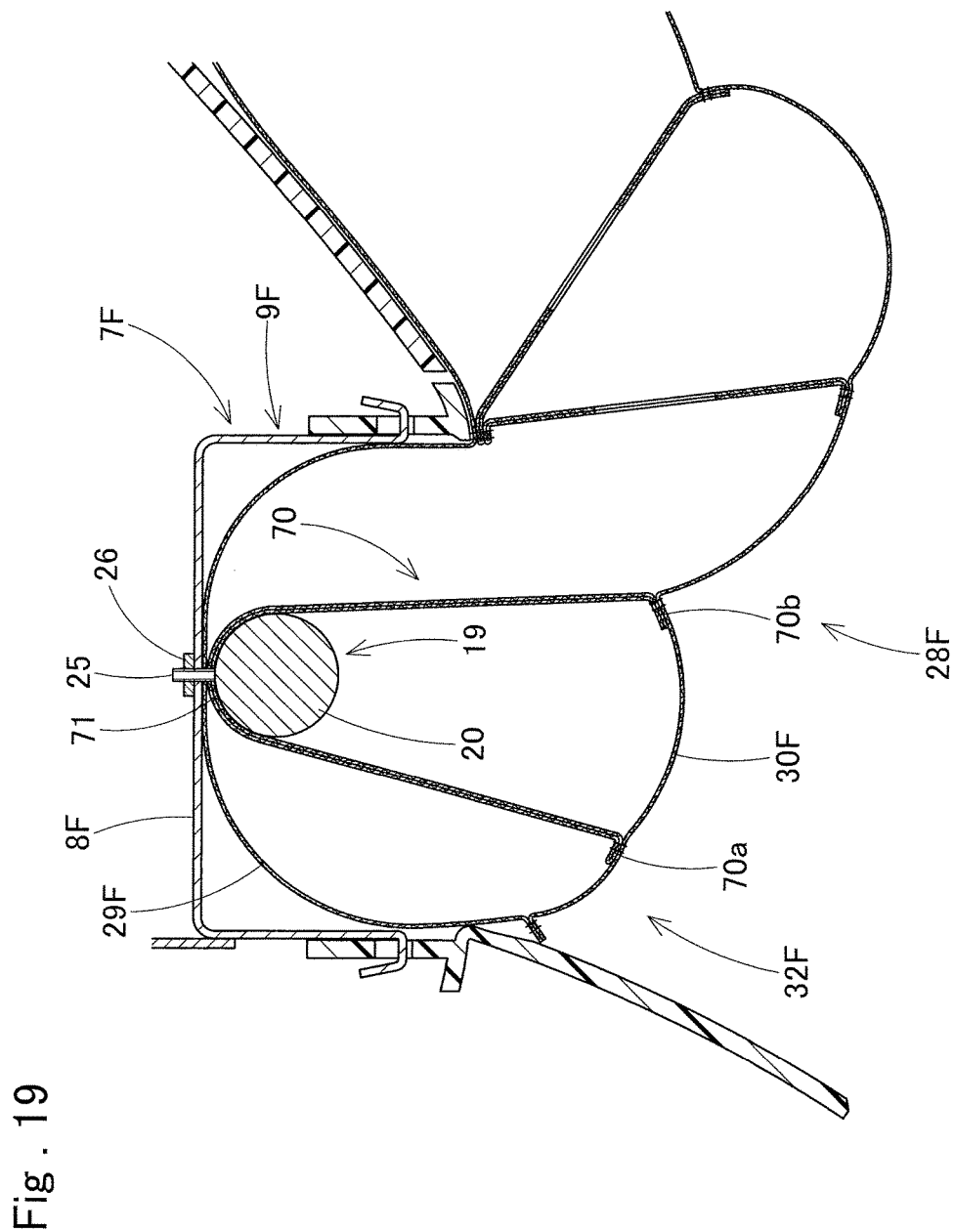
FIG. 19 is a schematic vertical section of yet another modification of the airbag as fully deployed, taken along a front and rear direction at a mounting inflatable region.

In the foregoing embodiment, the tether 37 is formed into a band deployable generally along a left and right direction at airbag deployment, and the first end in a width direction (i.e., the upper end) 37*a* of the tether 37 is joined to the vehicle body side panel 29 entirely while the second end in the width direction (i.e., the lower end) 37*b* of the tether 37 is joined to the occupant side panel 30 entirely, such that the tether 37 is disposed over a generally entire area in a left and right direction of the mounting inflatable region 32. However, the tether will work as the tether of the invention as long as it is capable of regulating a clearance between the vehicle body side panel 29 and occupant side panel 30 in the mounting inflatable region 32 at airbag deployment. By way of example, a knee-protecting airbag device shown in FIGS. 19 and 20 includes an inflator 19 which is housed in a vicinity of the center in a front and rear direction of a case 7F, and a band-shaped tether 70 disposed inside a mounting inflatable region 32F of an airbag 28F. The tether 70 is placed on the inflator 19 by the intermediate region, and opposite ends 70*a* and 70*b* of the tether 70 are joined to the occupant side panel 30 at positions mutually distant in four directions. More specifically, the tether 70 is mounted on the case 7F by the intermediate region (which will be called an attachment region 71 hereinafter) with the aid of mounting bolts 25, and opposite leading end regions (i.e., the ends 70*a* and 70*b*) each extend from the attachment region 71 towards the right front and left rear and are sewn to the occupant side panel 30F. That is, the tether 70 is joined to the vehicle body side panel 29 by the intermediate region (attachment region) 71 which is clamped between the ceiling wall 8 of the case 7F and inflator body 20. Furthermore, the tether may also be formed into a band with a narrow width and disposed at only one position in a vicinity of the center in a left and right direction of the mounting inflatable region of the airbag.

In the foregoing embodiment, the inflator 19 has a cylindrical body 20 and the mounting bolts 25 protruding directly out of the body 20. However, the configuration of the inflator should not be limited thereby. By way of example, the inflator may include a separate retainer which is mounted around the body and is provided with a bolt serving as the mounting means.

Although the foregoing embodiments have been described as embodied as a knee-protecting airbag device mounted in front of a front passenger seat, the invention may also be applied to those mountable in front of a driver's seat or mountable in front of a rear seat of a vehicle.

What is claimed is:

1. A knee-protecting airbag device mountable on a vehicle, comprising:
a case provided with an airbag emergence opening at a lower end region thereof;
an inflatable airbag that is housed in and mounted on the case in a folded-up configuration, the airbag including:
a vehicle body side panel deployable towards a vehicle body structure;
an occupant side panel deployable towards a seat of the vehicle;
a mounting inflatable region that is located in a lower end region of the airbag as deployed and is secured to the case;
a knee-protecting region that is deployable in such a manner as to extend rearwardly and upwardly from the mounting inflatable region for protecting knees of a vehicle occupant; and
an auxiliary inflatable region on the occupant side panel at a rear of the mounting inflatable region of the airbag as deployed, wherein the auxiliary inflatable region is deployable at the rear of the mounting inflatable region and in a vicinity of the case so as to protrude downward;
an inflator for feeding an inflation gas to the airbag, the inflator being generally cylindrical in outer contour and including a mounting means with which the inflator and airbag are mounted on the case;
a first tether that is disposed inside the mounting inflatable region of the airbag and joins the vehicle body side panel and the occupant side panel for regulating a clearance between the vehicle body side panel and the occupant side panel at airbag deployment, wherein the first tether is located proximate to the inflator; and a plurality of partitioning tethers arranged at a front and a rear of the auxiliary inflatable region, the plurality of partitioning tethers partition the mounting inflatable region, the auxiliary inflatable region, and the knee-protecting region.

2. The knee-protecting airbag device according to claim 1, wherein the first tether is deployable in front of the inflator.

3. The knee-protecting airbag device according to claim 2, wherein:
the first tether is formed into a band deployable generally along a left and right direction; and
a first end in a width direction of the first tether is joined to the vehicle body side panel generally entirely while a second end in the width direction of the first tether is joined to the occupant side panel generally entirely, such that the first tether is disposed over a generally entire area in a left and right direction of the mounting inflatable region.

4. The knee-protecting airbag device according to claim 1, wherein the first tether is deployable within an area immediately below the case in a front and rear direction.

5. The knee-protecting airbag device according to claim 1, wherein the first tether is brought into contact with the inflator at airbag deployment.

6. The knee-protecting airbag device according to claim 5, wherein the first tether is deployable at a rear of the inflator.

7. The knee-protecting airbag device according to claim 6, wherein:
the first tether is formed into a band deployable generally along a left and right direction; and
a first end in a width direction of the first tether is joined to the vehicle body side panel generally entirely while a second end in the width direction of the first tether is joined to the occupant side panel generally entirely, such that the first tether is disposed over a generally entire area in a left and right direction of the mounting inflatable region.

8. The knee-protecting airbag device according to claim 1, wherein
the first tether is disposed over a generally entire area in a left and right direction of the mounting inflatable region,
the first tether includes a gas communication hole that provides gas communication, and
the inflator is provided with a plurality of gas discharge ports on a first end of an axial direction, the gas discharge ports being located in a region coincided with the gas communication hole in the left and right direction.

* * * * *